(12) United States Patent
Doll et al.

(10) Patent No.: US 12,484,956 B2
(45) Date of Patent: Dec. 2, 2025

(54) SYSTEMS AND METHODS FOR TURBINATE REDUCTION

(71) Applicants: Smith & Nephew, Inc., Memphis, TN (US); Smith & Nephew Orthopaedics AG, Zug (CH)

(72) Inventors: Sean Doll, Cedar Park, TX (US); Troy S. Hemme, Minneapolis, MN (US); David A. Cox, Austin, TX (US); Douglas G. Evans, Austin, TX (US); David Turner, Austin, TX (US)

(73) Assignees: Smith & Nephew, Inc., Memphis, TN (US); Smith & Nephew Orthopaedics AG, Zug (CH)

( * ) Notice: Subject to any disclaimer, the term of this patent is extended or adjusted under 35 U.S.C. 154(b) by 712 days.

(21) Appl. No.: 17/786,246

(22) PCT Filed: Dec. 17, 2020

(86) PCT No.: PCT/US2020/065527
§ 371 (c)(1),
(2) Date: Jun. 16, 2022

(87) PCT Pub. No.: WO2021/127125
PCT Pub. Date: Jun. 24, 2021

(65) Prior Publication Data
US 2023/0045026 A1 Feb. 9, 2023

Related U.S. Application Data

(60) Provisional application No. 62/950,632, filed on Dec. 19, 2019.

(51) Int. Cl.
*A61B 18/14* (2006.01)
*A61B 18/00* (2006.01)

(52) U.S. Cl.
CPC ...... *A61B 18/1485* (2013.01); *A61B 18/1477* (2013.01); *A61B 2018/00327* (2013.01); *A61B 2018/00583* (2013.01); *A61B 2218/002* (2013.01); *A61B 2218/007* (2013.01)

(58) Field of Classification Search
CPC ............ A61B 18/1477; A61B 18/1485; A61B 2018/00327; A61B 2018/00583;
(Continued)

(56) References Cited

U.S. PATENT DOCUMENTS 6,749,608 B2 * 6/2004 Garito ................ A61B 18/1402
606/41
6,949,096 B2 * 9/2005 Davison ................ A61B 18/14
604/35

(Continued)

FOREIGN PATENT DOCUMENTS

WO 2018191253 A1 10/2018
WO 2018213465 A1 11/2018

OTHER PUBLICATIONS

Chinese Appiicatian No. 202080086309.0 The Second Office Action
(Continued)

*Primary Examiner* — Michael F Peffley
(74) *Attorney, Agent, or Firm* — Kate Ryland Tetzlaff; Norman F. Hainer, Jr.

(57) ABSTRACT

An electrosurgical wand for reducing tissue is disclosed. The wand includes a handle and an elongate shaft, the shaft having a major longitudinal axis, a conduit extending therethrough and a non-insulated distal end portion defining a first electrode. The first electrode has a distal most edge configured to mechanically pierce tissue, and an arcuate surface extending proximally from the distal most edge along the major longitudinal axis, the arcuate surface having a convex surface that faces in a distal direction. First and second arcuate edges define lateral edges of the arcuate (Continued)

surface. A second electrode is disposed at an opening of the conduit and electrically isolated from the first electrode. The second electrode comprises an aperture, configured to aspirate fluid and tissue debris therethrough.

20 Claims, 15 Drawing Sheets

(58) Field of Classification Search
CPC ...... A61B 2018/1213; A61B 2218/002; A61B 2218/007
See application file for complete search history.

(56) References Cited

U.S. PATENT DOCUMENTS

| | | | |
|---|---|---|---|
| 7,879,034 B2 * | 2/2011 | Woloszko | A61B 18/148 |
| | | | 606/41 |
| 8,747,401 B2 * | 6/2014 | Gonzalez | A61B 18/1485 |
| | | | 606/41 |
| 2012/0191089 A1 | 7/2012 | Gonzales et al. | |
| 2014/0200581 A1 * | 7/2014 | Aluru | A61B 18/14 |
| | | | 606/41 |
| 2016/0143683 A1 | 5/2016 | Aluru | |
| 2018/0191253 A1 | 7/2018 | Amoroso et al. | |
| 2018/0213465 A1 | 7/2018 | Karandikar et al. | |

OTHER PUBLICATIONS

Chinese Applicaiton No. 202080086309.0 The First Office Action and Search Report dated Oct. 18, 2022.

Search Report and WO for PCT/US2020/065527 dated Mar. 29, 2021, 18 pages.

Search Report and Written Opinion for PCT/US2020/065527 dated Mar. 29, 2021, 18 pages.

* cited by examiner

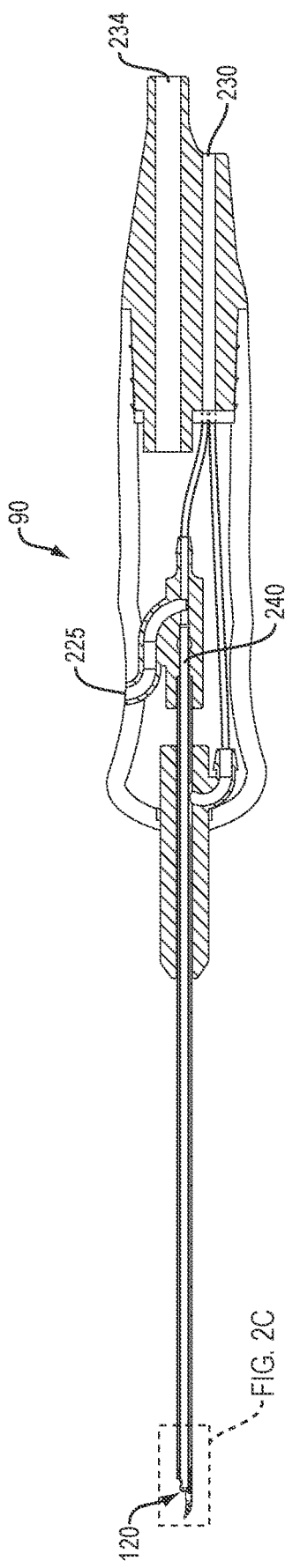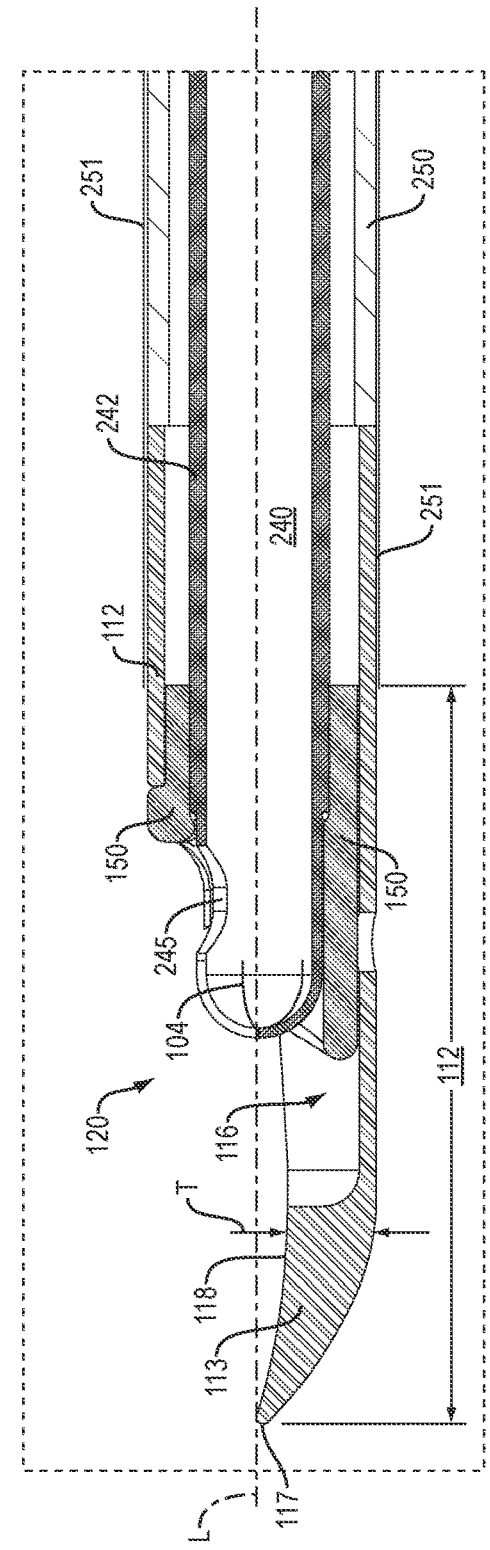
FIG. 2B
FIG. 2C

SYSTEMS AND METHODS FOR TURBINATE REDUCTION

CROSS-REFERENCE TO RELATED APPLICATIONS

This application is a U.S. National Phase Entry of PCT Application Serial No. PCT/US20/065527 filed Dec. 17, 2020 and titled "SYSTEMS AND METHODS FOR TURBINATE REDUCTION" which claims benefit to Provisional Patent Application No. 62/950,632 filed Dec. 19, 2019, titled "SYSTEMS AND METHODS FOR TURBINATE REDUCTION" and herein incorporated by reference in its entirety.

FIELD OF THE INVENTION

The present invention relates to the field of surgery and more particularly, to systems and methods for turbinate reduction using Electrosurgery.

BACKGROUND

A common nasal symptom, runny noses (e.g., allergic rhinitis or vasomotor rhinitis), is typically caused by small shelf-like structures in the nose called turbinates. Turbinates are responsible for warming and humidifying the air passing through the nose into the lungs. When the air contains an irritant, the turbinates react to the airborne particles by swelling and pouring mucus, as if the body were trying to block and cleanse the breathing passage. For temporary relief of swollen turbinates, decongestant nasal sprays and pills are often prescribed. These measures, however, have limited effectiveness, and the long-term use of such nasal sprays typically makes the problem worse. Moreover, decongestant pills may cause high blood pressure, increase the heart rate and, for some people, cause sleeplessness.

In the past several years, treatment that includes removing a portion of the turbinate has shown some promise. For example, powered wands, such as microdebrider wands have been used to mechanically remove portions of the turbinate. Microdebriders are disposable motorized cutters having a rotating shaft with a serrated distal tip for cutting and resecting tissue. The handle of the microdebrider is typically hollow, and it accommodates a small vacuum, which serves to aspirate debris formed by the rotating cutter. Microdebriders however suffer from a number of disadvantages. For one, the tissue in the nasal cavity is vascular, and the microdebrider severs blood vessels within this tissue, usually causing profuse bleeding that obstructs the surgeon's view of the target site. Therefore, the microdebrider often must be removed from the nose periodically to cauterize severed blood vessels, which lengthens the procedure. In addition the microdebrider is not precise, and it is often difficult during the procedure to differentiate between the target tissue and other structures within the nose, such as cartilage, bone or cranial. Thus, the surgeon must be extremely careful to minimize damage to the cartilage and bone within the nose, and to avoid damaging nerves, such as the optic nerve.

Treatments involving electrosurgical energy based wands have previously been described for turbinate reduction. Electrosurgical treatment electrodes, typically configured in a bipolar arrangement, may be inserted into the turbinate and may both molecularly dissociate tissue and thereby remove a portion of the turbinate, while offering selective coagulation should any bleeding occur. Such methods and apparatus are more fully described in previously filed applications, U.S. Pat. Nos. 9,254,166 and 9,649,144, the full disclosures of which have been incorporated by reference. These wands however may require the use of a separate device to gain access into the turbinate, such as a Cottle-tip elevator; and use thereof may add procedure time and cost. Therefore, there is a need for an electrosurgical device that reduces turbinate tissue while providing access to the turbinate.

Electrosurgical wands previously described are also larger in diameter (approximately 4-5 mm), which may advantageously minimize clogging in the suction line; however relative to the small size of the turbinate a reduced diameter wand closer to 2-3 mm may incur less tissue injury and make placement within the turbinate easier, reducing procedure time and blood loss. Therefore, there is a need for a small diameter wand, preferably less than 3 mm that offers controlled turbinate reduction, coagulation with minimal clogging to reduce procedure cost, time and ease of use.

Turbinate treatments are also performed with an obscured view of the treatment site, making precise treatments difficult to achieve. Therefore, there is a need to provide a device and method that provide feedback or guidance as to the location of the treatment location within the turbinate, without direct visualization.

BRIEF DESCRIPTION OF THE DRAWINGS

For a detailed description of example embodiments, reference will now be made to the accompanying drawings in which:

FIG. 2B schematically shows an cross section of a wand, according to at least certain embodiments;

FIG. 2C schematically shows a cross section of the wand distal end, shown in FIG. 2B;

SUMMARY

Figure 1:
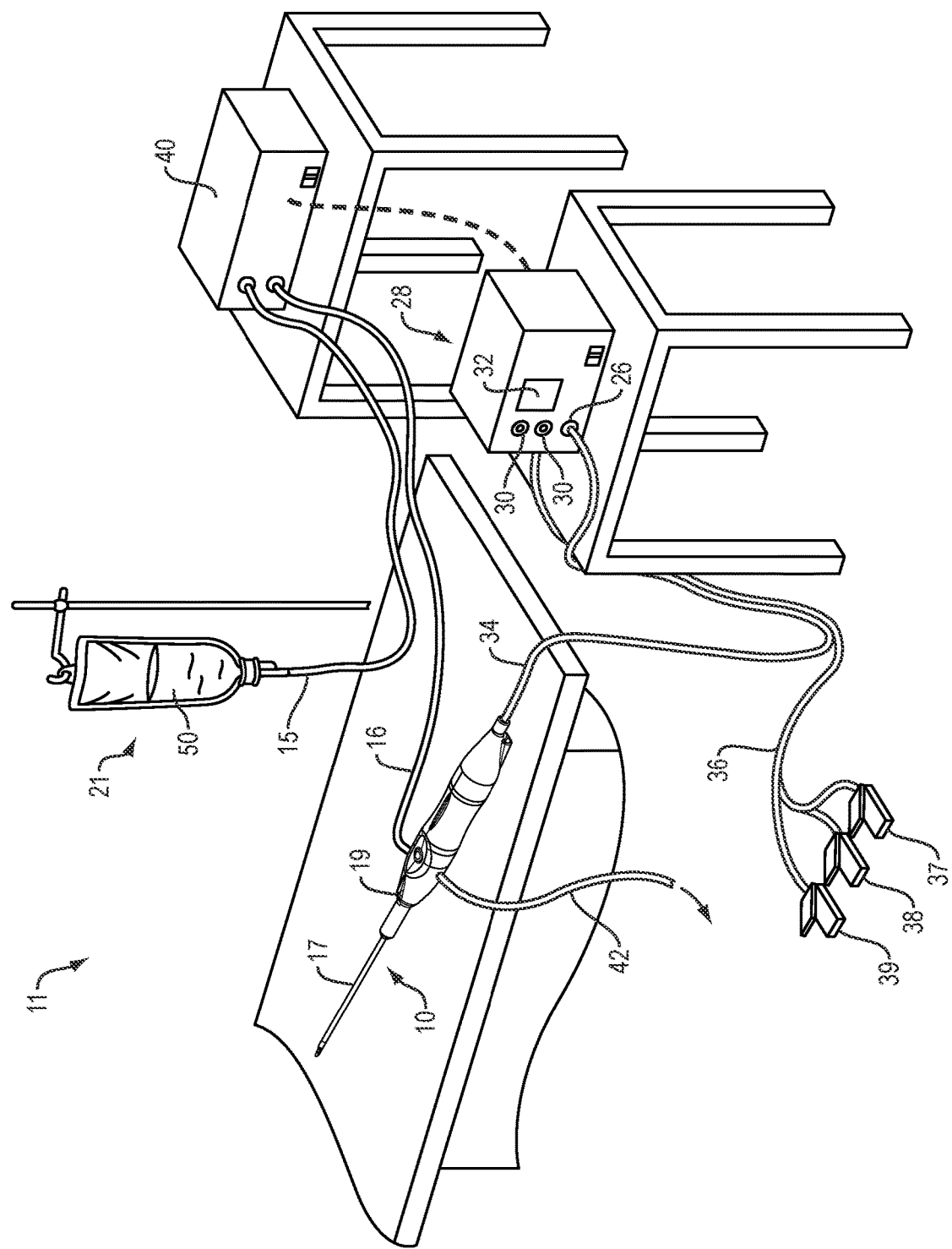
FIG. 1 shows a perspective view of an electrosurgical system according to at least certain embodiments.

Generally, this disclosure describes an electrosurgical device or wand that is bipolar to limit the tissue effect to the intended areas. The device diameter is preferably small in diameter (less than 3 mm) and is configured to access and treat turbinate tissue. Treating the tissue may include at least one of debulking the turbinate, debulking the turbinate with concomitant hemostasis to reduce bleeding, and reducing via thermally shrinking and coagulating the turbinate. The wand also includes a distal elevator tip that may provide initial piercing of the turbinate and access to the target tissue. The tip may also be used as a reference locator for placing the active electrode more centrally within the turbinate. The tip may also define a plough-like surface that directs the loosened tissue away from a suction aperture of the device, and thereby inhibits tissue from clogging the suction pathway.

A first example embodiment of an electrosurgical device for reducing a turbinate is disclosed, that may include a handle and an elongate shaft extending therefrom. The shaft defines a longitudinal axis, the shaft distal end defining a working portion. This working portion includes an elevator tip body that tapers to define a leading edge that is non-blunt and may pierce tissue. For example, this leading edge may be configured to pierce the turbinate to place the active electrode within the turbinate. The leading edge defines an arc that extends around the longitudinal axis in a first direction, and the elevator-tip body curves proximally from the leading edge defining a convex curved surface that is distal facing. The elevator tip body convex curved surface extends across and traverse the longitudinal axis. The elevator tip body is electrically conductive and may define a return electrode of the device. The device also includes an active electrode, spaced proximally from the leading edge and electrically isolated from the elevator tip body. The active electrode includes an aperture therethrough in fluid communication with a negative pressure source. The device may also include an inner tube fluidly coupled to the negative pressure source and active electrode aperture and coaxially disposed within the elongate shaft.

In some example embodiments, the elevator-tip body curve defines a distal facing curved surface configured to direct tissue that has been pierced and thereby loosened by the leading edge away from the active electrode aperture. In some example embodiments, the elevator tip body is configured to reduce clogging of the inner tube. In some example embodiments, the leading edge is configured to engage a turbinate bone and space the active electrode away from the turbinate bone. In some example embodiments, the elevator tip body is configured to guide the motion of the device through the turbinate to minimize an incision distention through the turbinate. In some example embodiments, the elevator tip leading edge coincides with a plane, which is parallel to the longitudinal axis and radially further from the longitudinal axis than the active electrode. In some example embodiments, the elevator tip body defines a maximum width that is equal to, or greater than a maximum outer diameter of the elongate shaft. In some example embodiments, the active electrode defines a loop, the aperture defined by the inner boundary of the loop. The transverse dimension of a single side of the loop is substantially smaller than a corresponding transverse dimension of the aperture. In some example embodiments the active electrode is nested within an electrically insulative spacer, the spacer configured to direct loose pieces of tissue away from the active electrode aperture. This insulative spacer may define a second reference surface that engages the turbinate bone and spaces the active electrode from the turbinate bone during turbinate reduction. The device may also include a fluid delivery construct, fluidly coupled to a fluid source external to the device. The device may have a fluid delivery aperture at the device distal end portion through a portion of the shaft on an opposing side of the distal end portion as the active electrode.

An example method of reducing a turbinate is also disclosed herein, the method including piercing the turbinate with a sharp leading edge of an electrosurgical instrument. Piercing may be achieved without energy being supplied to the instrument. The sharp leading edge may be coincident with a major longitudinal axis of the instrument. Alternatively, the sharp leading edge may be coincident with the longitudinal axis of the instrument. The method may also include engaging a turbinate bone surface with the sharp leading edge and a second reference surface of the instrument proximally spaced from the sharp leading edge, and thereby placing the active electrode away from the turbinate bone. The second reference surface may be an outer surface of an insulative spacer. The method may also include selecting a tissue treatment mode on an electrosurgical generator electrically coupled to the instrument and supplying energy to the active electrode to reduce the turbinate, and while supplying moving the active electrode through the turbinate while maintaining engagement between the bone surface and the sharp leading edge to reduce the turbinate.

In some example methods, selecting a tissue treatment mode comprises selecting from a group consisting of a high debulking mode, a medium debulking mode, and a thermal heating or shrinking mode. The medium debulking mode may include pulsing a voltage delivered to the tissue between a high voltage sufficient to debulk the turbinate and a lower voltage configured to thermally treat the tissue. The low mode may include delivery a low voltage sufficient to heat the adjacent tissue, with a periodic high voltage pulse to propel tissue away from the active electrode and reduce tissue sticking. Selecting a mode may also select a fluid delivery rate of electrically conductive fluid to the turbinate tissue. The method may also include aspirating fluid and tissue debris through an aperture through the active electrode. While piercing the turbinate, in some example methods loose turbinate tissue may be directed away from the active electrode with a distal facing curved surface extending proximally from the sharp leading edge.

A further example embodiment electrosurgical device is disclosed herein for treating a turbinate that includes a handle and a shaft. The shaft defines a major longitudinal axis and a conduit extending therethrough. The shaft includes a non-insulated distal end portion comprising a first electrode. This first electrode may be configured as a return electrode. The first electrode may include a distal most edge that may have an exposed electrosurgical surface, the distal most edge configured to mechanically penetrate tissue. An arcuate surface may extend proximally from the distal most edge along the major longitudinal axis, the arcuate surface being a convex surface defining a convex direction. The first electrode may also include first and second arcuate edges defining lateral edges of the arcuate surface, and the lateral edges may define exposed electrosurgical surfaces. The first electrode may also include a conduit opening proximally spaced from the distal most edge and on an opposing side to the convex direction. A second electrode may be nested within the conduit opening, and electrically isolated from the first electrode, the second electrode defining a loop with a single aperture therethrough, the single aperture in fluid communication with a fluid aspiration construct that extends along the shaft conduit.

In some example embodiments, the aperture defines a width that is substantially greater than a corresponding width of the active electrode loop. For example, the aperture width is at least twice a width of a single leg or side of the electrode loop. In some example embodiments, the shaft distal end defines an elevator tip including the distal-most edge and wherein a distal facing curved surface extends proximally from the distal-most edge. The distal-most edge may coincide with the longitudinal axis. The distal most edge may coincide with a plane that is parallel to the longitudinal axis and is radially further from the longitudinal axis than the active loop electrode. The distal facing curved surface may be configured to direct tissue that has been pierced and thereby loosened by the leading edge away from the active electrode aperture.

A further example electrosurgical device for volumetrically removing tissue is disclosed including a handle end and a distal working end, an outer shaft extending therebetween. The outer shaft has a longitudinal axis, and the distal working end terminated with a distal-most leading edge. This leading edge defines a non-blunt leading edge that defines a continuous curve around the longitudinal axis. At least a portion of the continuous curve intersects and traverses the longitudinal axis. The working end, including the leading edge may be electrically coupled to an electrosurgical power supply and is configured as a return electrode. An inner tube may extend coaxially with the outer shaft. The inner tube may be fluidly coupled to a vacuum source. The inner tube may be electrically conductive and may be coupled to the power supply. An inner tube distal end nests within an electrically insulative spacer and is configured as an active electrode. The inner tube further comprises a suction aperture therethrough coincident with the active electrode. The device also includes a fluid delivery conduit at least partially defined by the outer shaft and an outer surface of the electrically insulative spacer, the outer surface further defining an axial rib for forming a plurality of fluid delivery channels along the spacer outer surface, the plurality of channels having a first outlet through the outer shaft and coincident with the axial rib and a plurality of other outlets adjacent the active electrode.

In some example embodiments, the axial rib has a proximal portion defining a first rib width up to and including the first outlet and a second wider rib width that extends up to and including a distal most end of the spacer. The inner tube may extend from the active electrode to the handle. The inner tube may be formed of a Cobalt alloy. The inner tube may be is fluidly coupled to a second aperture disposed through the wand handle and configured to be selectable covered to control suction though the suction aperture. The second aperture may be selectively and at least partially covered to adjust a tissue effect at the active electrode between coagulation and ablation. The inner tube may terminate with a distal facing orthogonal surface across the inner tube extent, defining at least a portion of a perimeter of the suction aperture.

An additional example electrosurgical instrument is disclosed, including an inner tubular member forming an active electrode with an aperture therethrough at a distal end of the inner tubular member. The inner tubular member also includes a central lumen fluidly coupled to the aperture for selectively removing fluid and tissue therethrough, the inner tubular member terminating with an orthogonal distal facing surface having that a surface asperity therealong. The instrument also includes an outer tubular member including a proximal section, a distal tip, and a central lumen extending from the proximal section to a window proximally spaced from the distal tip. The lumen is sized to house the inner tubular member, the window sized to expose a portion of the inner tubular member to define the active electrode and the distal tip forming an elevator tip extending distal to the active election and terminating in a leading edge configured to pierce contacted tissue. In some embodiments, the inner tubular member is a single elongate tube, formed from a Cobalt Alloy and extends up to and including a handle of the electrosurgical instrument. The inner tubular member may be fluidly coupled to a second aperture through the handle and fluidly coupled to a vacuum source, the second aperture configured to be selectively covered and increase the vacuum applied along the inner tubular member. The fluid delivery conduit may be at least partially defined by the outer tubular member and an outer surface of an electrically insulative spacer, the outer surface further defining an axial rib defining a plurality of fluid delivery channels along the spacer outer surface, the plurality of channels having a first outlet through the outer tubular member and coincident with the axial rib and a plurality of other outlets adjacent the active electrode. The axial rib may have a proximal portion defining a first rib width up to and including the first outlet and a second larger width that extends up to and including a distal most end of the spacer. The second larger width portion may define fluid delivery channels that circumferentially direct the electrically conductive fluid bilaterally around to lateral sides of the active electrode. The suction aperture may have a perimeter at least partially formed by distal surface of the inner tubular member.

An additional example method of reducing a turbinate is disclosed including: deploying an electrosurgical instrument in a nasal cavity, the electrosurgical instrument including an inner tubular member coaxially disposed within an outer tubular member, the outer tubular member including a distal section forming a window and an elevator tip extending distally from the window, wherein the window is configured to expose an active electrode formed by the inner tubular member, and further wherein the elevator tip terminates in a sharp edge. The turbinate is then pierced with the sharp edge and the elevator tip and the elevator tip is engaged with a turbinate bone on a medial side of the turbinate. While engaging the elevator tip with the turbinate bone, supplying electrosurgical energy to the active electrode and a return electrode to reduce a portion of the turbinate electrosurgically. In some example methods, while supplying the electrosurgical energy, suction is selectively controlled through the inner tubular member and through an aperture adjacent the active electrode to adjust the rate of turbinate reduction. In some example methods an electrosurgical mode is first selected before supplying the energy, the mode may include a high mode having settings associated with a high rate of ablation or tissue debulking. These settings may include a high voltage setting and a high fluid delivery setting for example. In some example methods, the mode may include a medium mode that may have settings associated with a moderate rate of tissue debulking. The medium mode may include concomitant hemostasis. The medium mode may include a voltage lower than the high voltage setting. The medium may in include pulsing of voltage between a high voltage and a low voltage and a moderate fluid delivery rate. The fluid delivery rate may be controlled by a speed of a peristaltic pump for example. In some example methods, the mode may include a low mode, configured to deliver a voltage and fluid delivery rate that may thermally shrink the turbinate tissue. Low mode may include some pulsing of the voltage between a higher voltage sufficient to form a plasma for short periods, followed by a lower voltage that heats tissue.

In some embodiments, the inner tubular member may be fluidly coupled to a second aperture through a handle of the instrument, and selectively controlling suction may comprise selectively covering the second aperture. The example method may also include supplying electrosurgical energy and ceasing suction through the inner tubular member simultaneously. The method may also include uncovering the second aperture to reduce suction through the inner tubular member while continuing to supply energy and thereby altering a rate of turbinate debulking. The method may also include delivering an electrically conductive fluid to the distal section and into the turbinate before supplying the electrosurgical energy. The method may also include delivering an electrically conductive fluid by flowing the fluid along a plurality of annular channels defined by an axial rib in an electrically insulative spacer and an inner surface of the outer tubular member, the axial rib defining a first width that tapers to a larger width as the rib extends distally.

Notation and Nomenclature

Certain terms are used throughout the following description and claims to refer to particular system components. As one skilled in the art will appreciate, companies that design and manufacture electrosurgical systems may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

Reference to a singular item includes the possibility that there are plural of the same items present. More specifically, as used herein and in the appended claims, the singular forms "a," "an," "said" and "the" include plural references unless the context clearly dictates otherwise. It is further noted that the claims may be drafted to exclude any optional element. As such, this statement serves as antecedent basis for use of such exclusive terminology as "solely," "only" and the like in connection with the recitation of claim elements, or use of a "negative" limitation. Lastly, it is to be appreciated that unless defined otherwise, all technical and scientific terms used herein have the same meaning as commonly understood by one of ordinary skill in the art to which this invention belongs.

"Ablation" shall mean treatment of tissue based on tissue interaction with a plasma.

"Mode of ablation" shall refer to one or more characteristics of an ablation. Lack of ablation (i.e., a lack of plasma) shall not be considered an "ablation mode."

"Debulking" shall refer to removing tissue using ablation.

"Reducing" shall mean treating tissue with electrosurgery to physically remove or thermally shrink the tissue.

"Active electrode" shall mean an electrode of an electrosurgical wand which produces an electrically-induced tissue-altering effect when brought into contact with, or close proximity to, a tissue targeted for treatment.

"Return electrode" shall mean an electrode of an electrosurgical wand which serves to provide a current flow path for electrical charges with respect to an active electrode, and/or an electrode of an electrical surgical wand which does not itself produce an electrically-induced tissue-altering effect on tissue targeted for treatment.

"Pulsing" shall mean a modulated output energy of the AC voltage signal generated and delivered to at least one electrode on the wand, wherein the output energy modulates between an output energy sufficient to form an ionized vapor layer at the at least one electrode and an output energy that allows the ionized vapor layer to extinguish and still reduce the tissue.

"Blending" shall mean providing tissue debulking with concomitant hemostasis. This may include a pulsing output (defined above) between two electrodes (of equal or unequal surface area ratios).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention. All such modifications are intended to be within the scope of the claims made herein.

Methods recited herein may be carried out in any order of the recited events, which is logically possible, as well as the recited order of events. Furthermore, where a range of values is provided, it is understood that every intervening value, between the upper and lower limit of that range and any other stated or intervening value in that stated range is encompassed within the invention. In addition, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Last, it is to be appreciated that unless defined otherwise, all technical and scientific terms used herein have the same meaning as commonly understood by one of ordinary skill in the art to which this invention belongs.

Referring to FIG. 1, an exemplary electrosurgical system 11 for treatment of tissue in accordance with the present disclosure will now be described in detail. Electrosurgical system 11 generally comprises electrosurgical wand 10 that may be electrically connected to an electrosurgical controller (i.e., power supply) 28 for providing a high frequency voltage to a target site; and a fluid source 21 for supplying electrically conducting fluid 50 to wand 10 via fluid delivery tube 15/16. Fluid delivery may be controlled by pump 40, to provide a fluid flow supply that may be varied to wand 10 via delivery tube 16. Pump 40 may be in communication (shown as dotted line) with controller 28, such that selection of different modes (described in detail later) may alter a parameter of the pump to adjust the fluid delivery rate. Pump 40 is shown as a separate enclosure, but may be part of the same enclosure as the controller 28. In addition, electrosurgical system 11 may include an endoscope (not shown) with a fiber optic head light for viewing the surgical site, particularly in procedures in the ear or the back of the mouth. The endoscope may be integral with wand 10, or it may be part of a separate wand. The system 11 may also include a suction or aspiration tube 42 that may be configured to couple to a vacuum source (not shown), such as wall suction. Tube 42 as shown may be associated with the wand 10 for aspirating tissue debris and fluid from the target site. Alternatively, tube 42 may be operatively coupled to a pump (not shown) for example, such as a peristaltic pump.

Exemplary electrosurgical wand 10 comprises a handle 19 and an elongate shaft 17 extending distally from handle 19. The handle 19 typically comprises a plastic material that is easily molded into a suitable shape for handling by the surgeon. As shown, a connecting cable 34 has a connector 26 for electrically coupling the active electrode and return electrode (described in more detail in later figures) on wand 10 to power supply 28. Power supply 28 has an operator controllable energy/voltage level adjustment 30 to change the applied voltage level, which is observable at a display 32. Power supply 28 may also include first, second and third foot pedals 37, 38, 39 and a cable 36, which is removably coupled to power supply 28. The foot pedals 37, 38, 39 allow the surgeon to remotely adjust the voltage or energy level applied to active electrode. In an exemplary embodiment, first foot pedal 37 may be used to place the power supply into the "ablation" mode and second foot pedal 38 may place power supply 28 into a thermally heating mode (i.e., contraction, coagulation or other types of tissue modification without volumetric tissue removal/debulking). Alternatively, second foot pedal may place the power supply into a "blended" mode (blend of tissue removal or debulking and concomitant hemostasis). The third foot pedal 39 (or in some embodiments a foot-activated button) may allow the user to adjust the voltage level within the mode. In other embodiments, a series of hand switches along the wand handle 19 may replace at least some of the foot pedals.

The electrosurgical system 11 of the various embodiments may have a variety of operational modes. One such mode employs Coblation® technology. The assignee of the present invention developed Coblation® technology. A more detailed description of this technology can be found in commonly assigned U.S. Pat. Nos. 5,697,882, 6,355,032; 6,149,120 and 6,296,136, the complete disclosure of which is incorporated herein by reference. The electrosurgical system 11 may include a blended mode wherein a blend of tissue debulking and thermal shrinkage may occur within the same mode. A more detailed description of this mode can be found in commonly assigned U.S. patent application Ser. No. 16/613,730, the complete disclosure of which is incorporated herein by reference. The electrosurgical system 11 may include a pulsing thermal mode wherein the tissue is thermally treated to coagulate and shrink the turbinate tissue, pulsing intermittently with an ablation output, wherein the ionized vapor formed may be configured to reduce tissue sticking.

In some applications of the Coblation® technology, high frequency (RF) electrical energy is applied in an electrically conducting media environment to shrink or remove (i.e., resect, cut, or ablate) a tissue structure and to seal transected vessels within the region of the target tissue. Coblation® technology is also useful for sealing larger arterial vessels, e.g., on the order of about 1 mm in diameter. In such applications, a high frequency power supply is provided having an ablation mode, wherein a first voltage is applied to an active electrode sufficient to effect molecular dissociation or disintegration and debulking of the tissue, and a coagulation mode, wherein a second, lower voltage is applied to an active electrode (either the same or a different electrode) sufficient to heat, shrink, and/or achieve hemostasis of severed vessels within the tissue. A further blended mode may modulate the voltage between the first and second voltage to provide a blend of both tissue removal and tissue heating. A further pulsed mode may modulate the voltage between the first and second voltage to provide a tissue heating effect with intermittent higher voltages to remove tissue directly adjacent the active electrode.

The voltage difference applied between the return electrode(s) and the active electrode(s) will be at high or radio frequency, typically between about 5 kHz and 20 MHz, usually being between about 30 kHz and 2.5 MHz, preferably being between about 50 kHz and 500 kHz, often less than 350 kHz, and often between about 100 kHz and 200 kHz. In some applications, applicant has found that a frequency of about 100 kHz is useful because the tissue impedance is much greater at this frequency. In other applications, such as procedures in or around the heart or head and neck, higher frequencies may be desirable (e.g., 300-600 kHz) to minimize low frequency current flow into the heart or the nerves of the head and neck. The RMS (root mean square) voltage applied will usually be in the range from about 5 volts to 1000 volts, preferably being in the range from about 10 volts to 500 volts, often between about 150 volts to 400 volts depending on the active electrode size, the operating frequency and the operation mode of the particular procedure or desired effect on the tissue (i.e., contraction, coagulation, cutting or ablation.) Typically, the peak-to-peak voltage for ablation or cutting with a square wave form will be in the range of 10 volts to 2000 volts and preferably in the range of 100 volts to 1800 volts and more preferably in the range of about 200 volts to 1500 volts, often in the range of about 200 volts to 500 volts peak to peak (again, depending on the electrode size, number of electrons, the operating frequency and the operation mode). Lower peak-to-peak voltages will be used for tissue coagulation, thermal heating of tissue, or collagen contraction and will typically be in the range from 50 to 1500, preferably 100 to 1000 and more preferably 120 to 400 volts peak-to-peak (again, these values are computed using a square wave form). Higher peak-to-peak voltages, e.g., greater than about 800 volts peak-to-peak, may be desirable for ablation of harder material, such as bone, depending on other factors, such as the electrode geometries and the composition of the conductive fluid.

As discussed above, the voltage is usually delivered in a series of voltage pulses or alternating current of time varying voltage amplitude with a sufficiently high frequency (e.g., on the order of 5 kHz to 20 MHz) such that the voltage is effectively applied continuously (as compared with, e.g., lasers claiming small depths of necrosis, which are generally pulsed about 10 Hz to 20 Hz). In addition, the duty cycle (i.e., cumulative time in any one-second interval that energy is applied) is on the order of about 50% for the present invention, as compared with pulsed lasers which typically have a duty cycle of about 0.0001%.

The preferred power source of the present invention delivers a high frequency current selectable to generate average power levels ranging from several milliwatts to tens of watts per electrode, depending on the volume of target tissue being treated, and/or the maximum allowed temperature selected for the wand tip. The power source allows the user to select the voltage level according to the specific requirements of a particular neurosurgery procedure, cardiac surgery, arthroscopic surgery, dermatological procedure, ophthalmic procedures, open surgery or other endoscopic surgery procedure. For cardiac procedures and potentially for neurosurgery, the power source may have an additional filter, for filtering leakage voltages at frequencies below 100 kHz, particularly voltages around 60 kHz. Alternatively, a power source having a higher operating frequency, e.g., 300 kHz to 600 kHz may be used in certain procedures in which stray low frequency currents may be problematic. A description of one suitable power source can be found in commonly assigned U.S. Pat. Nos. 6,142,992 and 6,235,020, the complete disclosure of both patents are incorporated herein by reference for all purposes.

In the thermal heating or shrinking (coagulation) mode, the power supply 28 applies a sufficiently low voltage to the active electrode to avoid vaporization of the electrically conductive fluid and subsequent molecular dissociation of the tissue. The surgeon may automatically toggle the power supply between the ablation and thermal heating modes, by alternatively stepping on foot pedals 37, 38, respectively. This allows, for example, the surgeon to quickly move between coagulation and ablation in situ, without having to remove his/her concentration from the surgical field or without having to request an assistant to switch the power supply. By way of example, as the surgeon sculpts soft tissue in the ablation mode, the wand typically may simultaneously seal and/or coagulation small severed vessels within the tissue. However, larger vessels, or vessels with high fluid pressures (e.g., arterial vessels) may not be sealed in the ablation mode. Accordingly, the surgeon can simply step on foot pedal 38, automatically lowering the voltage level below the threshold level for ablation, and apply sufficient pressure onto the severed vessel for a sufficient period of time to seal and/or coagulate the vessel. After this is completed, the surgeon may quickly move back into the ablation mode by stepping on foot pedal 37. By way of a second example the surgeon may reduce the turbinate in an ablation mode, and thereby debulk the turbinate tissue, and then further reduce the turbinate by thermally heating a portion of the remaining turbinate in a low mode or thermal heating (coagulation) mode. Selecting each mode may also automatically adjust a fluid delivery rate to the wand distal end. For example selecting the debulking mode(s) may also direct the controller 28 to operate the pump 40 to deliver fluid at a rate configured to support the target rate of debulking the tissue, and selecting a thermal heating mode may direct the controller 28 to operate the pump 40 to deliver fluid at a rate configured to support thermally heating the tissue. The fluid delivery rate for debulking may be higher than the fluid delivery rate for thermally heating.

As an alternative to the surgeon toggling as described earlier, the system 11 may offer a pulsing or voltage modulation mode wherein a modulated voltage is provided to at least one electrode, which may be modulated between a high voltage period (i.e., sufficient to initially create an ionized vapor layer and then a plasma) and a low voltage period (i.e., insufficient to maintain the plasma). The time of the pulsing may be adjustable and dependent on preferences of the surgeon (e.g., 10 milliseconds (ms) of high voltage and 10 ms of low voltage, 5 ms on and 5 ms off, etc.), but generally the slower the pulsing the slower the debulking action provided. It is noted that the pulsing described in this section is a pulsing of the RF energy provided to the active electrode, which RF energy is applied in the form of a square wave (e.g., 50% duty cycle) at 100 kilohertz, so the pulsing should not be confused with the square wave application of RF energy. A square waveform at a debulking voltage, may operate at an exemplary 100 KHz, between 180 and 320V, that will generally form plasma at an electrode with a configuration such as active electrodes described herein. An exemplary square waveform at a thermally heating voltage, alternating at an exemplary 100 KHz, between 40-150V, will generally not form a plasma at an electrode similar to active electrodes described herein but seal smaller blood vessels and coagulate tissue in the local area. During a blended mode, an ablation voltage is supplied for a first period of time and then a coagulating voltage is supplied for a second period of time, these first and second periods of time may be approximately equivalent, but may be different to each other depending on the desired tissue effect. For example, a longer ablation period relative to a coagulating period tends to provide more plasma generation and debulking tissue effects with reduced hemostasis. The reverse ratio, with a longer period of time at a coagulating voltage relative to an ablating voltage would provide more hemostasis with slower debulking. For example, a debulking period of 8 ms, with a coagulating period of 2 ms provided strong debulking with minimal hemostasis, while the reverse provided minimal cutting with strong hemostasis. At the other extreme, a longer period of coagulation, for example 900-1600 ms, with a short pulse of higher ablation voltage, for example 150-300 ms may provide an improved thermal heating mode with reduced sticking. In this improved mode, during the higher ablation voltage period, a plasma is formed, this plasma interacts with tissue to at propel it away from the electrode surface and may also molecularly dissociate a portion of this stuck tissue, and thereby reduce the adjacent tissues from sticking to the wand distal end.

Moreover, and as alluded to in the previous paragraph, the pulsing is between a high voltage and a lower voltage, the lower voltage preferably above zero volts or at a working voltage that coagulates tissue (above 10 volts). The inventors have found that pulsing between a high voltage in the range of 200-320 volts and lower voltage in the range of 10-150 volts was preferable. For the embodiments described herein, pulsing between a high voltage in the range of 250-300 volts and lower voltage in the range of 100-150 volts was more preferable, the values adjusting depending on levels of desired debulking and thermal treatment. For example, pulsing between 300 volts and 70 volts would provide both aggressive debulking and thermal heating, while pulsing between 300 and 30 volts would provide aggressive debulking and reduced thermal heating. In the improved thermally heating mode, delivering a heating voltage setting of about 130V interrupted periodically with a high voltage pulse of about 250-300V to briefly form a plasma, may propel the tissue away from the distal end. These values may vary with electrode configuration.

Figure 2A:
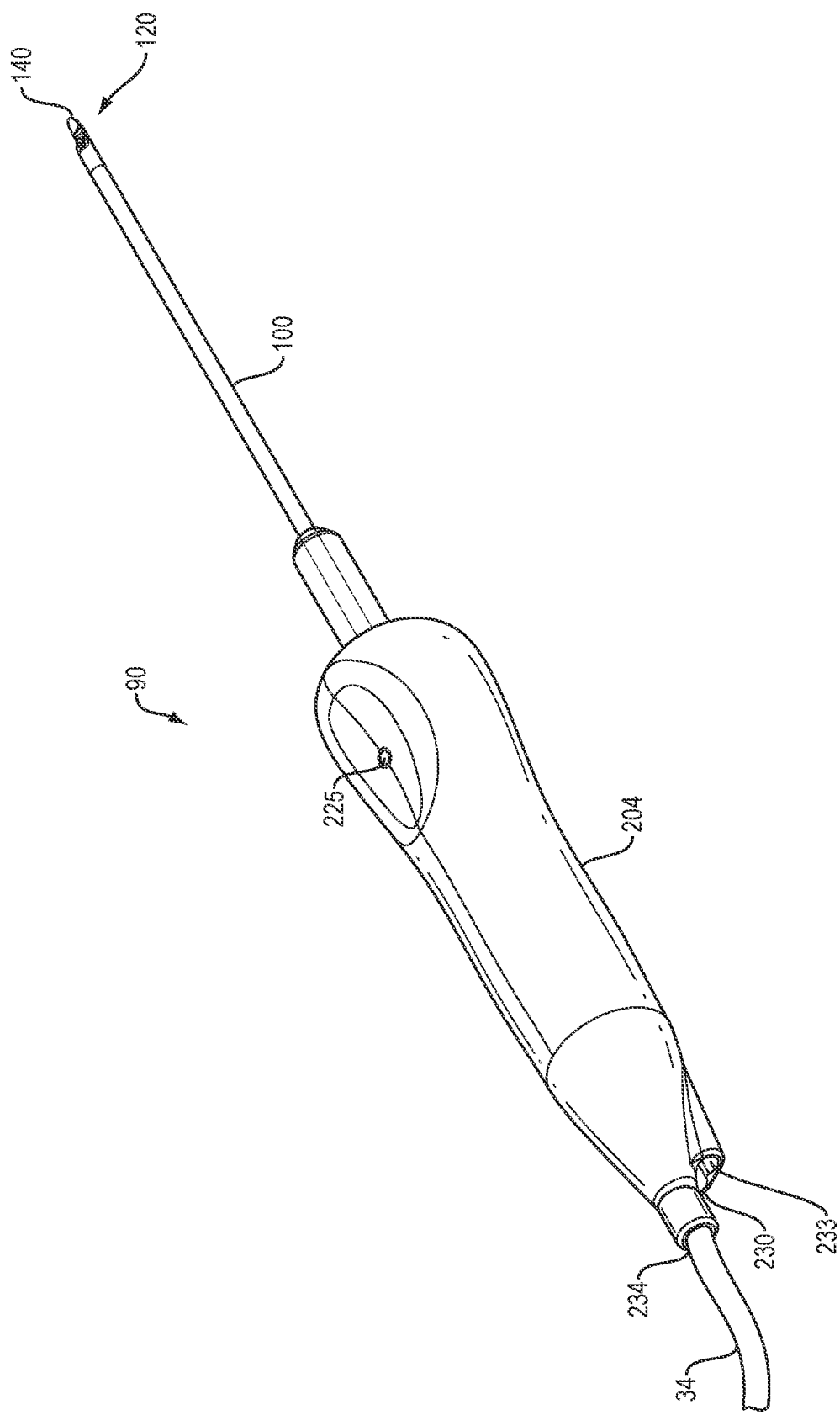
FIG. 2A schematically shows an isometric view of a wand for treating tissue according to at least certain embodiments.

FIG. 2A illustrates a first exemplary embodiment electrosurgical wand 90 constructed according to the principles of the present disclosure, and configured to operate with system 11. As shown in FIG. 2A, wand 90 generally includes an elongate shaft 100 and a handle 204 coupled to the proximal end of shaft 100. Handle 204 typically comprises a plastic material that is easily molded into a suitable shape for handling by the surgeon. Handle 204 defines an inner cavity that houses electrical connections (not shown) and provides a suitable interface for connection to an electrical connecting cable 234, such as cable 34. Inner cavity may also house fluid connections between aspiration and delivery lumens. As shown in FIG. 2A, a fluid inlet 233 extends through an opening in handle 204, and may be in fluid communication with a tube 16 and fluid supply source 50, and is configured to supply electrically conductive fluid to the wand distal portion 120 and subsequently to the target site. Fluid inlet 233 may fluidly couple with a fluid delivery construct including at least one lumen that extends through handle 204 and along shaft 100. In some embodiments, Wand 90 may also include a valve or equivalent structure (not shown) on the wand 90 or tubing 16, for controlling the flow rate of the electrically conducting fluid to the target site. A fluid outlet 230 may also extends through an opening in handle 204, and may fluidly couple to tube 42 that may couple to a vacuum source and remove fluid and debris from the wand distal portion 120. Suction control port 225 on the handle 204 may be in fluid communication with fluid outlet 230, to allow the surgeon to control suction by moving his or her finger. In operation, when the port 225 is not covered, there is no or minimal suction at the wand distal end portion 120. This may reduce potential to clog the suction lumen by limiting suction to times that are chosen by the user.

Suction port 225 may be selectively covered while delivering energy to control and adjust the desired tissue effect. Suction portion may include a plurality of suction ports 225 adjacent each other, to provide a gradient of suction at the wand distal end portion 120. Suction ports 225 may be on opposing sides of handle 204 for example top and bottom side so that for example a first port could be covered by an index finger, while a second by a thumb. In use, with none of the plurality of suction ports 225 covered, there may be minimal suction at the wand distal end 120. With all of the plurality of suction ports 225 covered, there may be maximum suction at the wand distal end, and therefore with some apertures 225 uncovered and some covered, there may be an intermediate level of suction at the wand distal end. Control of the tissue effect may be best described using the following examples. For example, upon delivery of energy in the ablation mode, with minimal suction at the distal end (all apertures 255 left uncovered), there may be a low level of ablation and some concomitant coagulation at the distal end 120. Should one of the plurality of suction ports 225 covered, there may be a moderate or intermediate level of suction that in cooperation with energy delivery in ablation mode, may product a tissue effect with more ablation and some minimal concomitant coagulation. As a third example method, should all of the plurality of suction ports 225 be covered, there may be a maximum or higher level of suction that in cooperation with energy delivery in ablation mode, may produce a tissue effect with higher levels of debulking and minimal or no concomitant coagulation. Considering now an energy delivery that is coagulation mode, in general altering the levels of suction may offer differing depths and levels of tissue coagulation that may therefore alter a size of tissue lesion formed. For example upon delivery of energy in the coagulation mode, with minimal suction, (or none of the plurality of apertures 225 covered,) there may be surface level coagulation (and no ablation) at the distal end 120. Should one of the plurality of suction ports 225 be covered, there may be a moderate or intermediate level of suction that in cooperation with energy delivery in coagulation mode, may produce a tissue effect with deeper coagulation, as the suction may increase tissue contact with the coagulating electrodes. As a third example method, should all of the plurality of suction ports 225 be covered, there may be a maximum or higher level of suction that in cooperation with energy delivery in coagulation mode, may produce a tissue effect with deeper and stronger coagulation, possibly for bigger blood vessels or more bleeding in the area for example.

In the embodiment shown in FIGS. 2A, wand 90 generally includes a shaft distal portion 120 and distal-most tip 140. Distal-most tip 140 may include a leading sharp, jagged or piercing edge, operable to help gain access to the turbinate and may dissect tissue or create a window into tissue such as a polyp or turbinate. Distal-most tip 140 may be rigid, enabling it to be more readily directed into a targeted body structure and thereby provide access to the inside of the body structure. In this embodiment, distal-most tip 140 may be the distal tip of shaft 100 and may be energized or part of the return electrode 112 (described later).

Now turning to FIG. 2B, showing a cross section of the wand 90, including shaft 100, distal portion 120 and handle 204. Suction control aperture 225 is fluidly coupled to tubular shaft 242 defining suction conduit 240, shaft 242 extending up to and including the distal portion 120. Conduit 240 is fluidly coupled to outlet 230. Tubular shaft 242 may be electrically conductive and a distal portion may define the active electrode 104 with a suction aperture 245 therethrough, on a lateral side of distal portion 120. Suction aperture 245 in fluid communication with conduit 240. Suction conduit 240 is sized to remove debris and fluid from the area adjacent the active electrode 104. An exposed portion of the tubular member 242 defines the active electrode 104, the non-exposed portion of tubular member 242 defined by a variety of electrically insulating means such as a ceramic spacer, coatings, and insulating sheaths. A portion of tubular member 242 may be in electrical communication with connector 234 and thereby the power supply 28 to provide energy to the tubular member 242 and thereby active electrode 104. Tubular member 242 is also a sufficiently rigid material to add structural rigidity to the wand 90.

Combining the suction conduit 240 and active electrode 104 into a single tubular member 242 may advantageously reduce the wand diameter by eliminating components, such as the need to run wires to the tip of the device. In addition, a separate active electrode to a suction conduit may need additional coupled/fixation means to the shaft, such as adhesives, snaps, posts etc. Having a singly formed component that is both the active electrode 104 and suction conduit 240 reduces the need to add fixation means and associated features. A single component tube 242 that extends all the way into the handle also reduced transitions in the inner lumen of the suction conduit along the shaft, transitions that may increase clogging, transitions such as those described in U.S. Pat. Nos. 9,254,166 and 9,649,144, the full disclosures of which have been incorporated by reference. Active electrode 104 is configured to form a plasma and thereby ablate tissue, with the concomitant environment delivery of a voltage or energy sufficient to ionize the electrically conductive fluid. Materials for the active electrode are also a factor, with previously disclosed materials including platinum, molybdenum, tungsten, titanium, nickel, iridium, or their alloys, as these materials are electrically conductive but also resist plasma degradation. However many of these materials are not conducive to forming an elongate tubular shaft that extends along the length of the shaft and into the handle portion. The inventors have found that using a material such as a Cobalt Alloy, and more specifically Co-20Cr-15 W-10Ni is preferable to form a single elongate tubular shaft as a fluid conduit that may also act as an active electrode resistant to plasma degradation. This alloy is also known as L605 or Haynes 25. Alternative material options may include 316L, MP35N, Phynox, and Elgiloy but they have minimal resistance to plasma degradation and/or more difficulty achieving a plasma. The Cobalt alloy can economically be made into tube form, for the length of the wand shaft and may be between 3 and 10 inches long, and may have a lumen inner diameter between 0.02 to 0.08 inches along it entire length. This Cobalt alloy is also conducive to forming an extremely smooth surface finish, which also reduces tissue build-up and clogging.

Turning now to FIG. 2C, illustrating a cross section of a wand distal end 120, shaft 100 may include a tubular outer shaft 250 coaxially disposed around the tubular member 242. Outer shaft 250 may be electrically conductive and provide the electrical communication between the return electrode 112 and the connector 234. Outer shaft 250 may be coated or covered with an electrically insulative material 251 to have a non-conductive outer surface between the return electrode 112 and handle 204. Return electrode 112 may extend from a distal-most end of sheath 251 up to a distal tip. Return electrode 112 defines an exposed portion of conductive material and extends axially both proximally and distally further relative to the active electrode 104. The active electrode 104 is generally surrounded or at least partially encircled by electrode 112. Return electrode 112 has a proximal tubular portion continuous with the shaft 250, defining a lumen for receiving the tubular member 242 and active electrode 104 therein. Return electrode 112 may terminate with an elevator-tip 113 having a distal leading edge 117 configured to mechanically pierce turbinate tissue to place the active electrode 104 within the turbinate. Distal leading edge 117 may define a continuously curved edge surrounding a top platform 118 of tip 113. Elevator tip 113 may be electrically coupled to or form part of return electrode 112, but energy may not be necessary or preferable to initially pierce the turbinate tissue. Elevator tip 113 is configured to be sufficiently rigid to elevate and pierce tissue and therefore defines a thicker portion (T) distal to active electrode 104. Leading edge 117 may terminate substantially along a plane that is coincident with the wand longitudinal axis L-L. Distal leading edge 117 is continuous with bilateral edges 121 that extend predominantly axially and proximally from leading edge 117 and may have a minimal concave curvature relative to the longitudinal axis (L_L) therealong. A portion of bilateral edges 121 may also include an edge configured to aid in separating tissue to gain access to the turbinate. This allows for components that are working components operable to provide a bipolar electrosurgical effect to be in operative communication with tissue, components including the active electrode 104, fluid delivery apertures and fluid/debris removal apertures. Tip also includes a convex arcuate surface 119 that curve towards the longitudinal axis as the tip extends distally, providing a gliding surface during piercing of the turbinate. Surface 119 may define a convex surface and define a convex side of the longitudinal axis of the device. Piercing the turbinate is at least partially a blind process, and the user pierces the turbinate and then may place the leading edge 117 on the bone medially disposed relative to the turbinate. Sliding the distal end 120 further into the turbinate while maintaining the leading edge 117 on the bone surface may optimally place the active electrode 104 in the middle of the turbinate.

Figure 5:
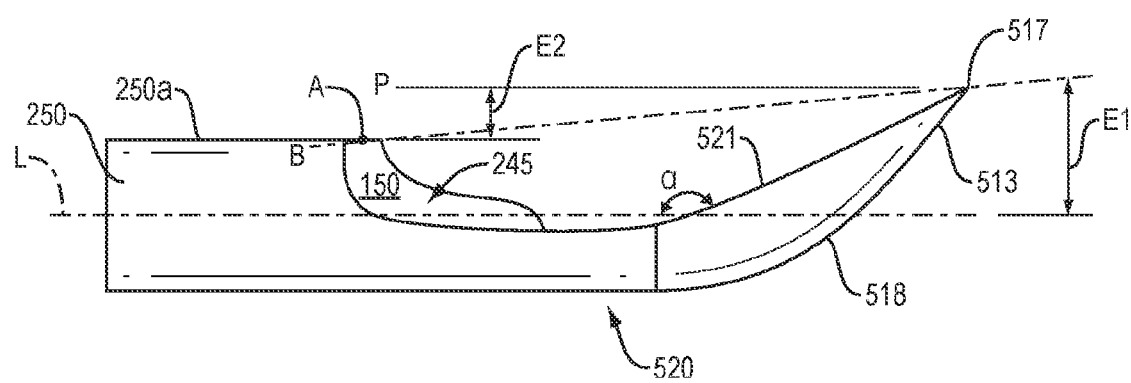
FIG. 5 illustrates a side view of an alternative embodiment of a wand distal end having an extended elevator tip, according to at least certain embodiments.

In alternative wand distal end elevator tip embodiment 520 is illustrated in FIG. 5, the tip 513 may be define an extended curve configuration so that leading edge 517 may coincide with a plane P on the same side of the longitudinal axis L-L as the active electrode 104 (obscured from view in FIG. 5) and radially spaced further from the longitudinal axis L-L than the leading edge 117 shown in at least FIGS. 2B and 2C. In this alternative embodiment, distal leading edge 517 is continuous with bilateral edges 521 that extend proximally from leading edge 517 and may have a curvature or angular orientation relative to the longitudinal axis (L_L) therealong. Bilateral edges 521 may extend along an angle α relative to the longitudinal axis, the angle defining an obtuse angle. In some preferred orientations, the angle may be between 115-150 degrees. Leading edge 517 may be disposed radially further than the active electrode 104 from longitudinal axis. In some embodiments leading edge 517 may be disposed further than an upper external surface 250a of outer shaft 250 from the longitudinal axis. Leading edge 517 may lie on a plane P that is elevated a distance E1 from longitudinal axis and a distance E2 from upper external surface 521. Distal end may also include an inner arcuate surface extending proximally from the distal most edge 517 along the major longitudinal axis, the arcuate surface having a concave surface defining a concave direction, and on the opposite side of the convex arcuate surface 518. First and second arcuate edges may define lateral edges 521 of the arcuate surface.

Figure 8A:
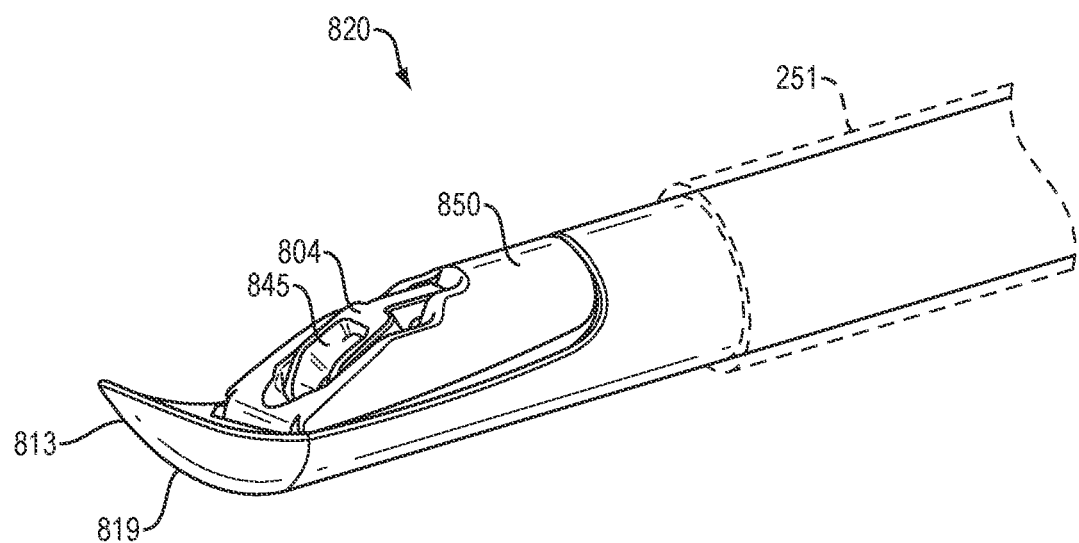
FIG. 8A illustrates an isometric view of an alternative embodiment of a wand distal end for treating a turbinate according to at least certain embodiments.
Figure 8B:
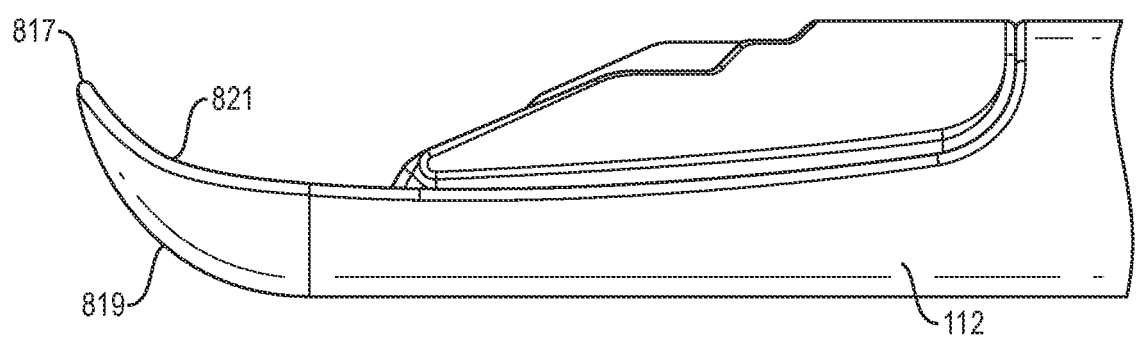
FIG. 8B illustrates a side view of the alternative distal end embodiment shown in at least FIG. 8A.
Figure 8C:
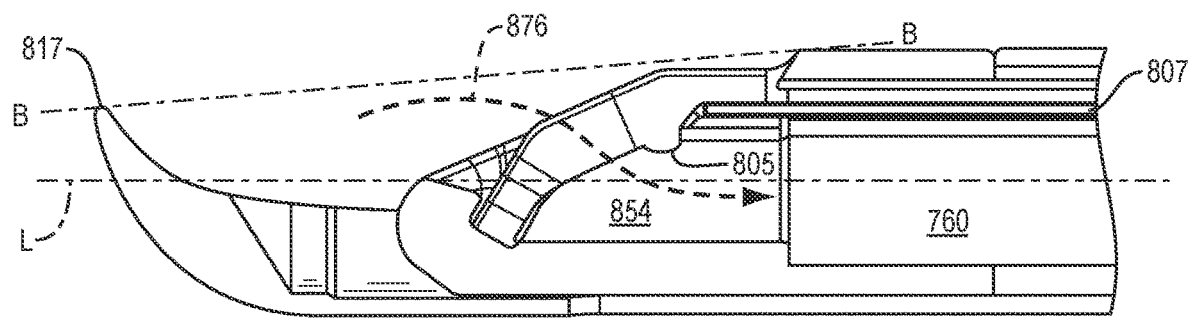
FIG. 8C illustrates a cross section view of the alternative distal end embodiment shown in at least FIG. 8A.
Figure 8D:
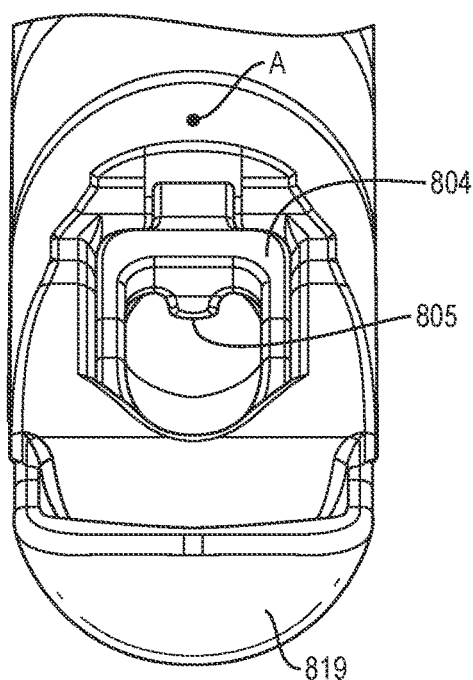
FIG. 8D illustrates an end view of the alternative distal end embodiment shown in at least FIG. 8A.

Extended tip configuration 513 may offer a variety of advantages. For example, the tip 513 may form a distal facing curved surface 518 that acts as a plough, directing tissue that is freed by the piercing tip 513 away from the suction aperture 245. While piercing the turbinate, portions of turbinate tissue may be mechanically cored or freed by the piercing tip. A tip with an extended curved surface 518 as shown in FIG. 5 or FIG. 8A may block or redirect these loose turbinate tissue portions away from the aperture 245 more so than the curved surface 119 illustrated in other embodiments. The more extended the curved configuration the more tissue may be redirected and thereby clogging of the suction conduit 240 may be incrementally reduced.

Figure 6B:
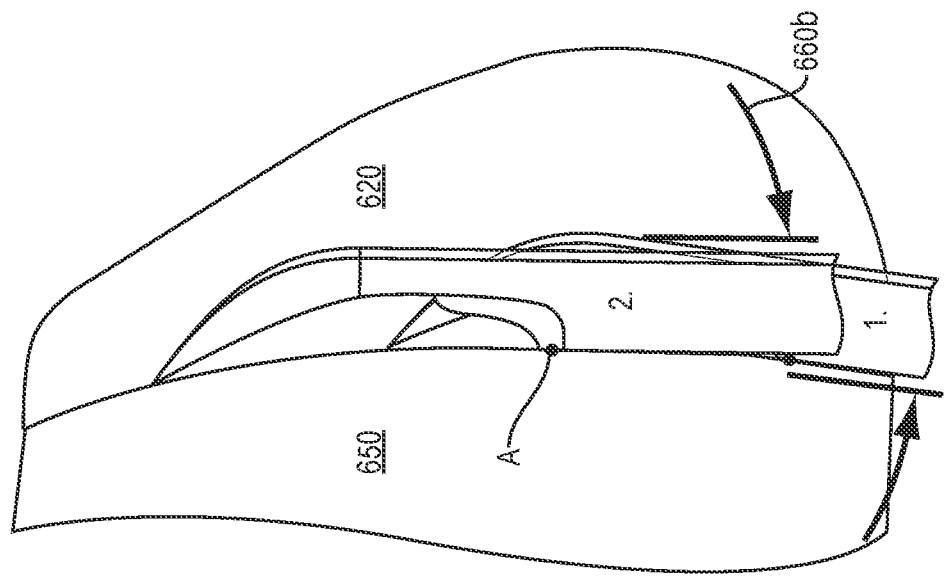
FIG. 6B illustrates a method of treating a turbinate with a wand embodiment with an alternative embodiment of an elevator tip, according to at least certain embodiments.
Figure 6A:
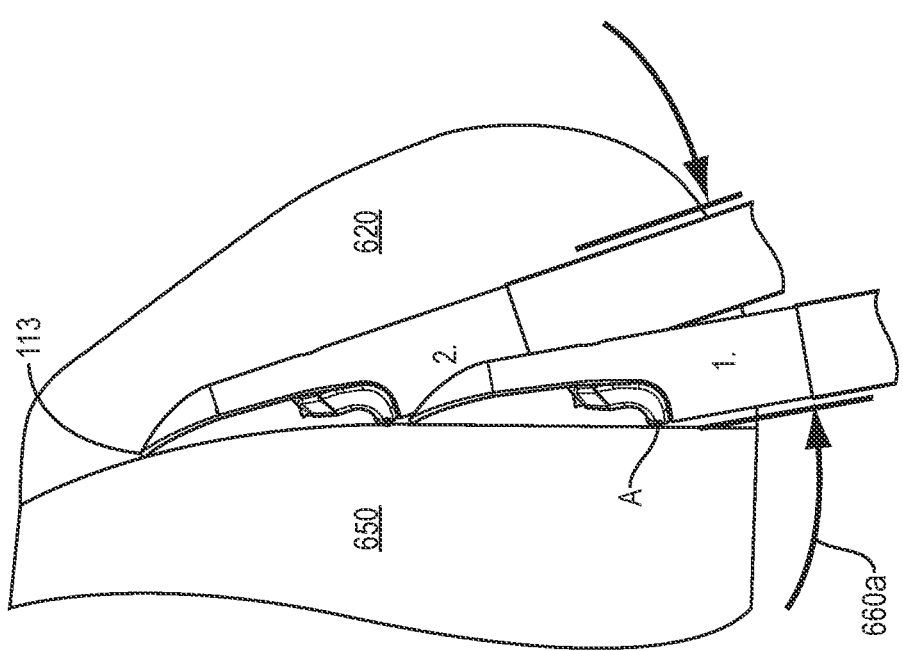
FIG. 6A illustrates a method of treating a turbinate with a wand embodiment, according to at least certain embodiments.

Leading edge 517, similar to edge 117 is configured to engage and track along the turbinate bone within the turbinate 620 during use, best illustrated in FIGS. 6A and 6B. The turbinate bone 650 provides a reference surface as the treatment is often performed without direct visualization. In general, the tip 113 or 513 is configured to place the active electrode 104 away from the turbinate bone 650 and more centrally located within the turbinate 620. An additional contacting surface is defined by an external surface at point A, which may be an external surface of the spacer 150 or shaft 100. Engaging the bone with both the tip leading edge 117 or 517, and point A, may place the active electrode in a preferred location, central within the turbinate. Stated alternatively, active electrode 104 is spaced away from a line of intersection B-B that extends through both point A and leading edge 517 or 117. With the more extend curved configuration, such as tip 513 the active electrode 104 may be spaced further from the turbinate bone 650. The extended tip curvature may place the active electrode 104 in a more central location within the turbinate 620. With increased tip curvature, there may be a correlating reduction an incision distention 660 of the entry incision, as shown in FIGS. 6A and 6B. FIG. 6A illustrates a first wand distal end embodiment 120 with a tip 113 as disclosed herein. FIG. 6B illustrates a second wand distal end embodiment 520 with an extended curvature configuration. In both FIGS. 6A and 6B, leading edge 117 and 517 are engaged with turbinate bone 650 and may be translated along the turbinate bone 650 both posteriorly and anteriorly (shown as position 1 and position 2) while electrosurgically treating the turbinate tissue 620. The incision 660 may distend during this translation to accommodate the motion of the wand during treatment. It is preferably that the edge (117, 517) maintain contact with the bone while moving and reducing the turbinate. In some methods, it may also be preferable that point "A" maintain contact while moving and reducing the turbinate. This maintains a target location for the active electrode in the middle of the turbinate and spaced from the bone 605. It can be seen when comparing FIG. 6A with 6B, that a tip such as tip 113 may require a larger incision distension 660a than for the more aggressive tip 513 as illustrated in FIGS. 6A and 6B. For the same translation between position 1 and 2, incision distention 660b is smaller and more preferable than incision distention 660a.

Returning now to FIG. 2C, return electrode 112 defines a cavity 116 to receive the ceramic spacer 150 and active electrode 104 therein, in order to position portions of return electrode 112 adjacent to but not in contact with active electrode 104. The return electrode 112 is preferably disposed in such a way to maintain a near uniform distance between the active electrode 104 and return electrode edge surrounding the active electrode, for as much of the active electrode 104 profile as possible. By maintaining a substantially consistent and smaller distance between the active and return electrode, a lower energy or voltage may be required by a power supply 28 to create a required tissue effect, and the more localized the tissue effect may be, creating a very controlled tissue effect, which is preferable to the surgeon. This may minimize unwanted tissue treatment outside the intended area. In the embodiment shown, distances between active and return electrode may be between approximately 0.2 mm and 1.5 mm, and embodiments may preferably be approximately 0.8 mm.

Figure 2D:
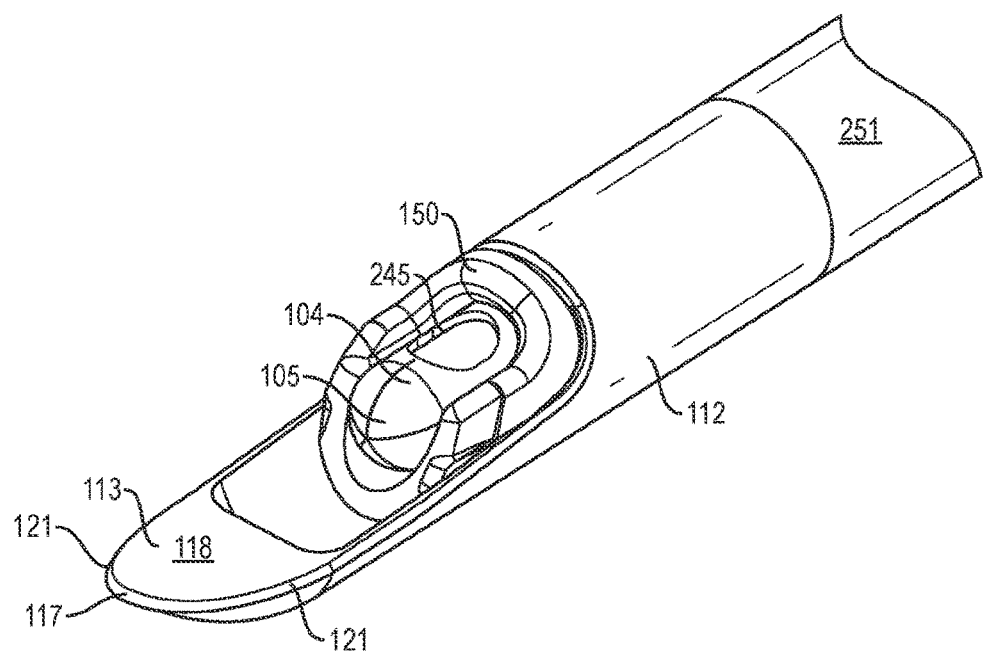
FIG. 2D schematically shows an isometric view of the wand distal end shown in at least FIG. 2C.
Figure 2E:
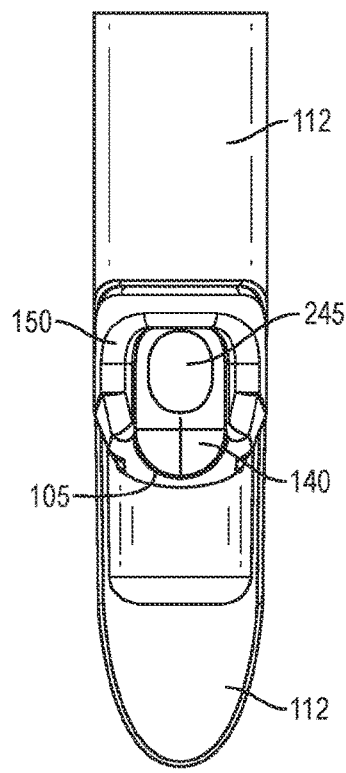
FIG. 2E schematically shows a top down view of the wand distal end portion shown in at least FIG. 2C.

Best seen in FIGS. 2C and 2D, active electrode 104 is nested within an electrically insulative spacer 150. Spacer 150 may be tubular with an inner diameter sized to receive the distal end of tubular member 242 and thereby the active electrode 104. The active electrode 104 defines an exposed portion of electrically conductive tube 242 as disclosed previously, the electrically conductive tube 242 defining suction conduit 240. Spacer distal opening is shaped so as to wrap around and define the exposed portion of electrically conductive tube 242 and thereby the active electrode 104. Electrically conductive tube 242 and spacer 150 are fixedly coupled and do not rotate relative to each other or relative to the outer shaft 250 and return electrode 112. Spacer 150 is not only electrically insulative but also configured to minimally degrade with plasma, and may be formed of a ceramic material. A portion of spacer 150 telescopes into return electrode 112 (seen in FIG. 2C). Active electrode 104 may have a rounded or bulbous distal most end 105 with suction aperture 245 spaced proximal from the end 105. Suction aperture 245 is sized to increase tissue removal and may extend both circumferentially around sides of tube 242 and axially to be coincident with a proximal edge of spacer opening (see FIG. 2E). Aperture 245 may be non-circular, or extend longer axially than circumferentially. Aperture 245 may be laterally disposed and define a central axis substantially perpendicular to the shaft longitudinal axis. Aperture 245 may also be sized to enable the insertion of a declogging tool. Wand distal end 120 is generally smooth and angled to provide good access to target tissue.

Figure 2F:
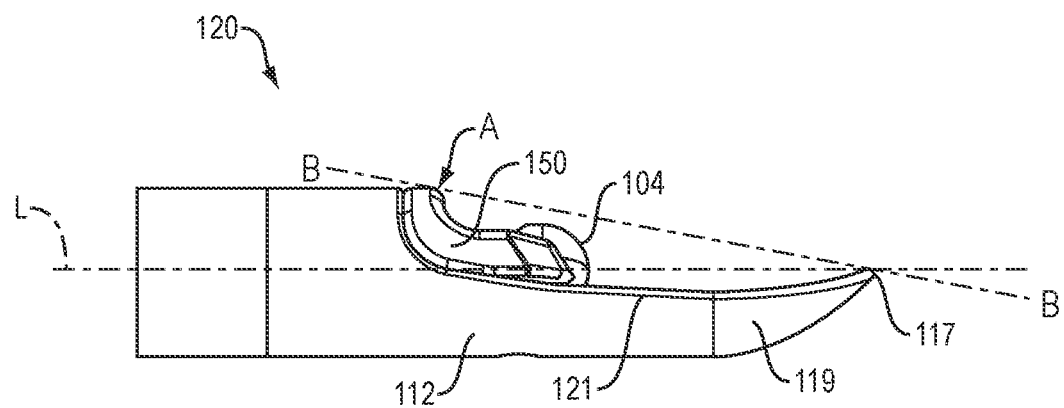
FIG. 2F schematically shows a side view of the wand distal end portion shown in at least FIG. 2C.

Turning to FIG. 2F, a side view of distal end 120 is shown, including a leading edge 117 that may be coincident with a longitudinal axis L-L. The line of intersection B-B is also shown, through point A and leading edge 117, with active electrode 104 spaced medially from line B-B. As explained earlier, this allows for preferred placement of active electrode 104 within the turbinate tissue, using both reference surface A and leading edge 117 as contacting points with the turbinate bone. Having a less aggressively curved tip, as shown in FIG. 2F may provide a preferred spacing of active electrode 104 from bone.

Figure 2G:
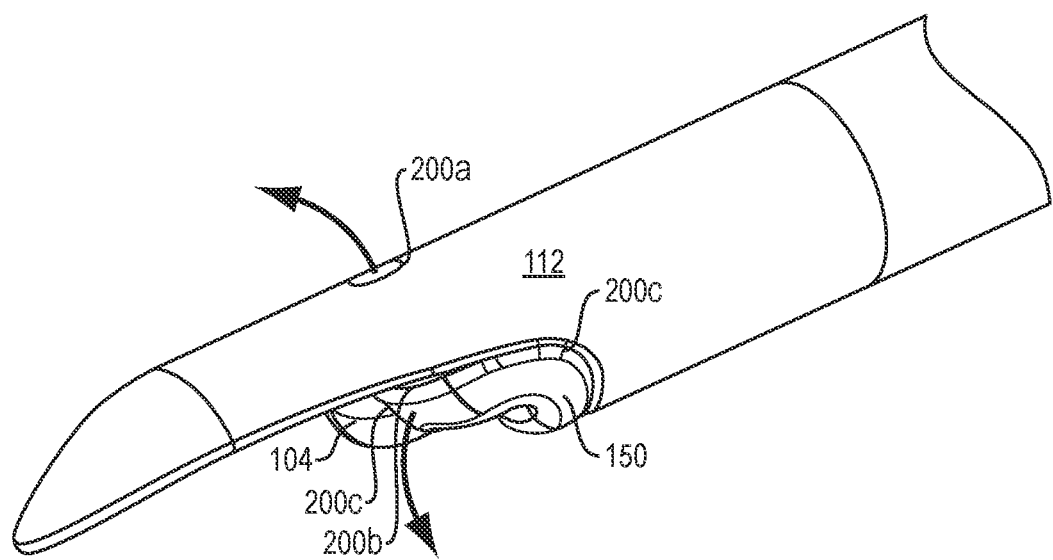
FIG. 2G schematically shows an isometric view of the wand distal end shown in at least FIG. 2C.
Figure 2H:
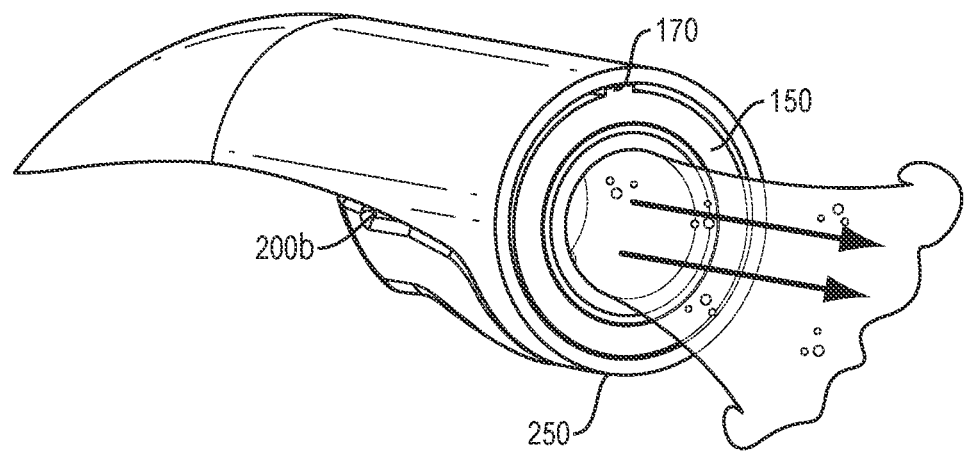
FIG. 2H schematically shows a transverse cross section of a wand distal end portion according to at least certain embodiments.
Figure 2I:
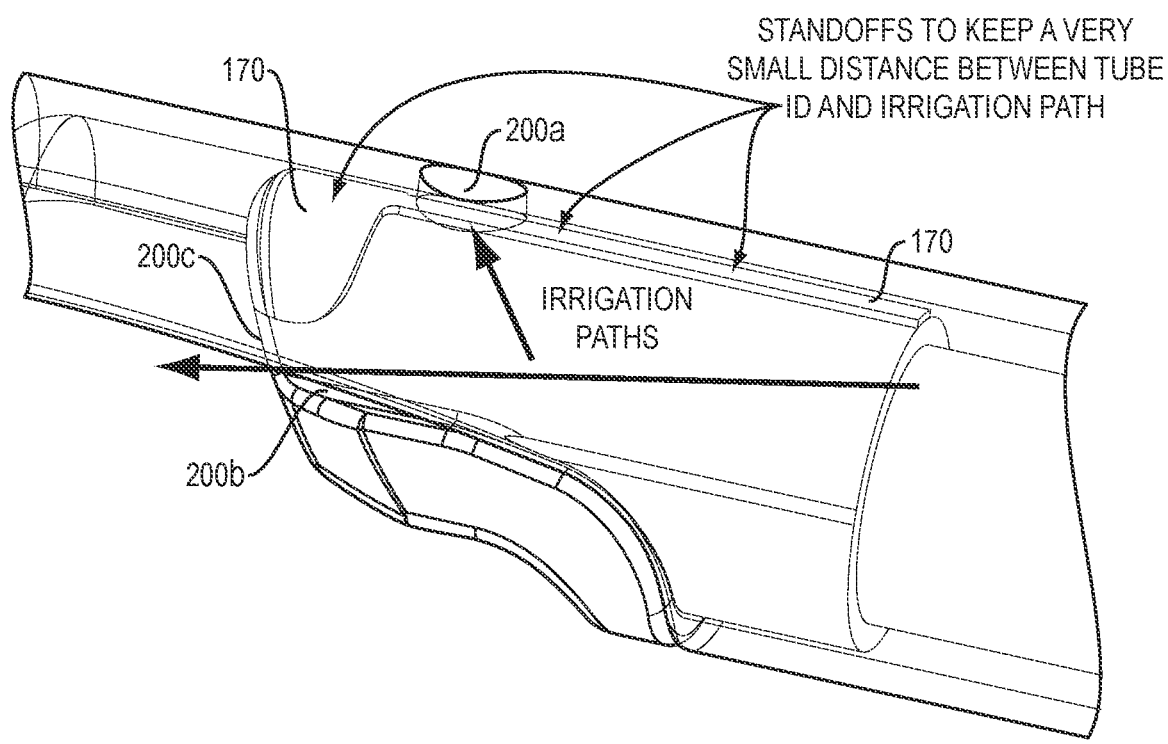
FIG. 2I schematically shows a wand distal end with a semi-transparent outer shaft according to at least certain embodiments.

Referring now to FIGS. 2G, 2H and 2I, the disclosure will now describe the fluid delivery conduit and pathway for supplying electrically conductive fluid to the area adjacent the active electrode 104. The irrigation for this device may run between the handle and the distal end 120 in an annular cross-section between the tubular member 242 (which has an electrically insulated outer surface) and an inner lumen of the outer shaft 250. At the distal end, irrigation can pass through annular openings between the ceramic spacer 150 and the return electrode tubular portion, as seen best in FIG.

2H and FIG. 2I. In this embodiment, the fluid outlet 200A is on top of the spacer 150 and bilateral (2) fluid outlets 200B on lateral sides of the spacer 150. In some embodiments, further outlets can be added through any openings formed through the outer tube 250.

At distal end 120, irrigation fluid flows axially between small annular gaps formed between outer surfaces of the ceramic spacer 150 and inner surface of return electrode 112, the gaps formed by a first rib 170. Rib 170 may be formed as part of ceramic spacer 150, return electrode 112 or may be a separate component. As shown rib 170 defines a proximal end that is a single rib 170 extending axially and parallel to the longitudinal axis, which may bilaterally and substantially equally split the fluid delivery laterally around each side of the active electrode 104. A single outlet 200*a* is coincident with rib 170, the single outlet 200*a* having a larger diameter than rib width to allow some fluid to flow out of outlet 200*a*. Rib 170 or standoff may expand bilaterally and circumferentially, at a location just distal to outlet 200*a* up to and including a distal most end of spacer 150 so as to direct flow circumferentially and around towards lateral sides of active electrode 104. The larger portion of rib 170 may also provide a larger surface area for adhesive coupling and fluidly sealing return electrode 112 to spacer 150, limiting fluid ingress under the spacer 150. Spacer 150 is shaped to form at least two bilateral pairs of outlets 200*b* and 200*c*. Outlet 200*b* is formed between a lateral spacer edge and bilateral edges 121 to supply fluid to a lateral side of active electrode 104. Outlet 200*c* is configured to provide fluid flowing a distal orientation towards a distal bulbous portion of active electrode 104. Fluid delivery outlets 200*a*, 200*b* and 200*c* are generally configured to surround the active electrode from multiple directions and adequately wet the active electrode and bridge an electrical connection between the return electrode 112 and active electrode 104. Fluid delivery outlets 200*a*, 200*b* and 200*c* are generally configured to direct fluid around the tip and preferably not around a distal-most end of spacer 150 as this may create a virtual electrode and/or a shunt electrical path between the return electrode 112 and active electrode 104. Multiple fluid delivery outlets 200*a*, 200*b* and 200*c* are preferable to continue to provide the electrically conductive fluid, even if one of the outlets is clogged. Fluid delivery outlets 200*b* and 200*c* generally surround lateral portions of the active electrode 104.

It is preferable for the electrode surfaces to be uniformly wetted to create a more-even electrical field between the active electrode 104 and return electrode 112, so as to create a more reliable and uniform tissue effect. Areas of the return external surface that are relatively dry may induce resistive heating effects and unwanted tissue effect is those areas. Fluid delivery may be controlled so as to deliver fluid only while energy is being delivered to the wand distal end 140 and may be communicable coupled to the controller so as to automatically deliver fluid concomitant with energy application. A separate control or method may further include priming the turbinate cavity formed while piercing the turbinate with conductive fluid. The priming may improve electrode wetting and may be separately controlled with a button on wand handle for example.

A method of reducing a turbinate is therefore envisioned including placing an electrosurgical wand distal end into a nasal cavity and within a selected turbinate using a non-blunt distal leading edge of an elevator tip (113, 513, 813) to first pierce the turbinate 620 and then to further advance the distal end into the turbinate 620. A leading edge 117, 517 of the elevator tip may contact and slide along a boney portion 650 of the nasal cavity while advancing the distal end of the wand into the turbinate. This may be achieved without the use of electrosurgical energy. Energy may be selectively applied should tissue coagulation be needed while advancing the wand. An active electrode 104 of the wand may then be positioned directly adjacent a portion of turbinate to be removed. The elevator tip 113, 513 may be configured to place the active electrode 104 centrally within the turbinate 620, while the edge (117, 517, 817) engages the turbinate bone 650. More specifically, with minimal direct observation, both a leading edge (117, 517, 817) and a second reference surface A proximally spaced from the active electrode 104 may engage the turbinate bone, and thereby place the active electrode 104 in a target location within the turbinate. Electrically conductive fluid may then be delivered to the wand distal end to pre-prime the turbinate cavity, electrically conductive fluid delivered through a fluid supply conduit along the wand. The conduit may be an annular conduit along the wand shaft. The conduit may be at least partially defined by a rib 170 that splits the fluid bilaterally around and external surface of an electrode spacer and to a plurality of fluid outlets adjacent active electrode. The rib may be an integral portion of outer surface of spacer 150 of the wand that engages an inner surface of shaft. The rib 170 extends circumferentially towards a rib distal end to deliver the fluid from a plurality of fluid delivery apertures that are balanced with each other. A vacuum source may be initiated, the vacuum source in fluid communication with an aperture 225 through the wand handle and an active electrode aperture 245. Power supply 28 (shown in FIG. 1) may then be activated to debulk the turbinate tissue 620 adjacent the active electrode 104. The electrically conductive fluid provides the conduction path between active electrode 104 and the return electrode 112. The method may include selectively covering the handle aperture 225 to increase suction pressure at the active electrode aperture 245 and thereby remove fluid, plasma by products and tissue debris. The aperture 225 may be partially covered or completely covered to alter the balance between ablation and tissue coagulation while delivering energy to the wand distal end. The aperture 225 may be covered only when energy is applied to limit unintended tissue aspiration that may induce suction lumen clogging. Wand 90 may be translated and/or rotated to ablate and thereby debulk tissue mass of the target turbinate 620. Wand 90 may be translated while maintaining the edge 117, 517 engaged with turbinate bone 650. While translating the wand, a convex distal facing curved surface extending from the edge (117, 517) may direct loosened tissue away from the aperture 245 and thereby reduce aperture clogging. Additionally, by virtue of the fluid pressure provided by the pump 40, the conductive fluid provided into the nasal cavity may have the effect of enlarging the opening for accessing and treating the targeted the nasal tissue. The effect of the fluid under pressure provided within the accessed cavity tissue is to expand the opening and provide additional space within the cavity tissue that allows for effective plasma formation at the active electrode 104. The rate of fluid delivered may be controlled by pump 40, or alternatively with a valve (not shown), such that the zone between the tissue and electrode spacer 150 is constantly immersed or coated with the fluid and the return electrode 112 is sufficiently wetted.

Depending on the procedure, the surgeon may rotate and/or translate the electrode 104 relative to the turbinate tissue to form holes, channels, stripes, divots, craters or the like within the turbinate. In addition, the surgeon may purposely adjust the power supply to a coagulating mode to treat a severed blood vessel or create some thermal damage within these holes, or channels to form scar tissue that will inhibit the turbinate from swelling after the procedure.

In example systems, the user may select "Modes" of energy output that set RF generator(s) output of the controller to pre-set output energy level, each mode correlating to a desired tissue reduction interaction with the target tissue, such as debulking or thermal heating, or vessel coagulation. The controller 28 may also control the rate of fluid delivery to the wand distal end (120, 520, 720, 820), in conjunction with the selectable energy outputs, and certain tissue modes or selections made by the user may trigger certain pre-set fluid flow rates to further improve the tissue effect.

For example, the controller may have a high mode, if the user wishes for a high rate of tissue debulking and the generator may supply energy sufficient to form plasma and remove tissue at a high rate. The controller may also have a medium mode that may provide a medium rate of tissue debulking or alternatively provide a blended mode, which may provide concomitant ablation with some hemostasis. This may initiate a pulsing of the RF generator 28 in which the RF generator modulates between supplying energy sufficient to form a plasma and then reducing voltage to enable the plasma to collapse, with the pulsing providing an initial heating effect while the plasma is forming and some hemostasis. This may debulk tissue at a lower rate than at high mode, and provide some tissue shrinking and bleeding control simultaneously. As explained earlier, varying levels of debulking and hemostasis may be achieved with corresponding ratios between the cutting and hemostatic periods of the pulsing duty cycle. Each mode selection may also alter the fluid delivery to tissue 620 and wand distal end 120, 520. When thermal heating is preferred, the surgeon ay select a low mode, wherein the tissue is thermally treated using a lower voltage. An intermittent high voltage pulse may remove tissue near the electrode. When larger vessels are encountered, or some bleeding, a coagulation mode may be selected, where no ablation is desired. Fluid delivery may be reduced automatically during low mode compared to ablation and blended modes.

In some methods, the physician axially rotates the shaft distal portion 120, 520 within the turbinate tissue as the tissue is volumetrically removed to form one or more holes in the turbinate, typically having a diameter of less than 3 mm, preferably less than 2 mm. In addition, the voltage delivered by power supply 28 can be controlled so that the energy directed to the target site is insufficient to ablate bone or adipose tissue (which generally has a higher impedance than the target sinus tissue). In this manner, the surgeon can literally clean the tissue off the bone, without ablating or otherwise effecting significant damage to the bone.

Figure 3B:
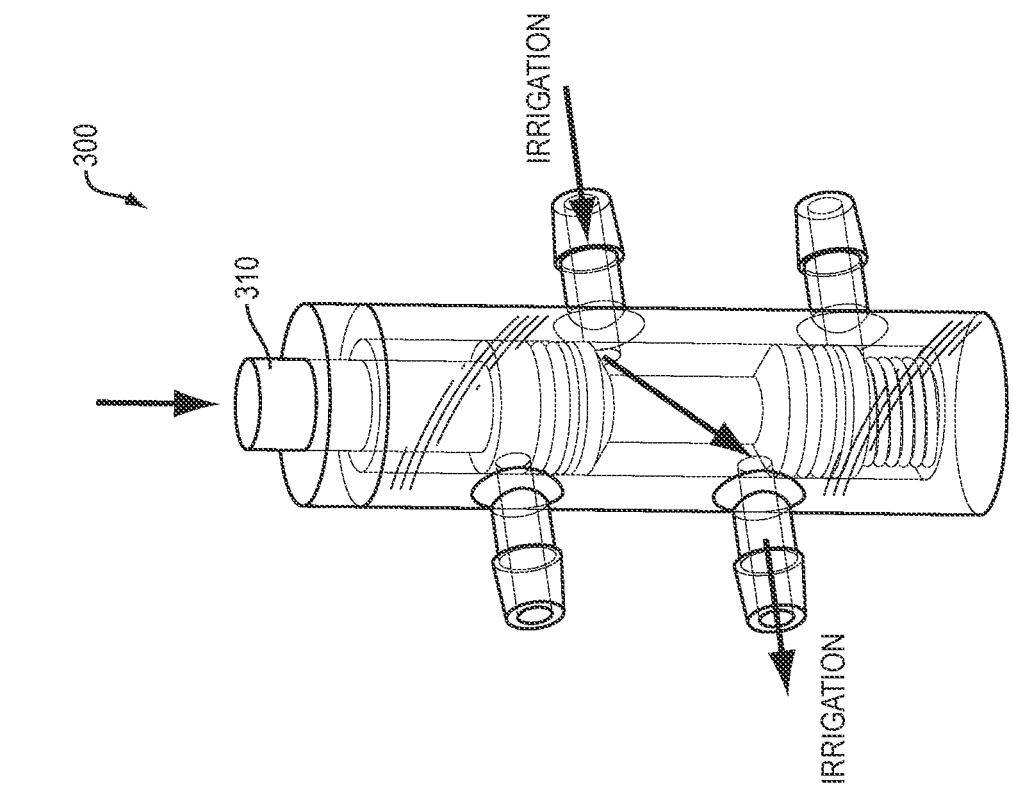
FIGS. 3A and 3B schematically show a switch valve option for fluidly coupling to the fluid tubing of a wand according to at least certain embodiments.
Figure 3A:
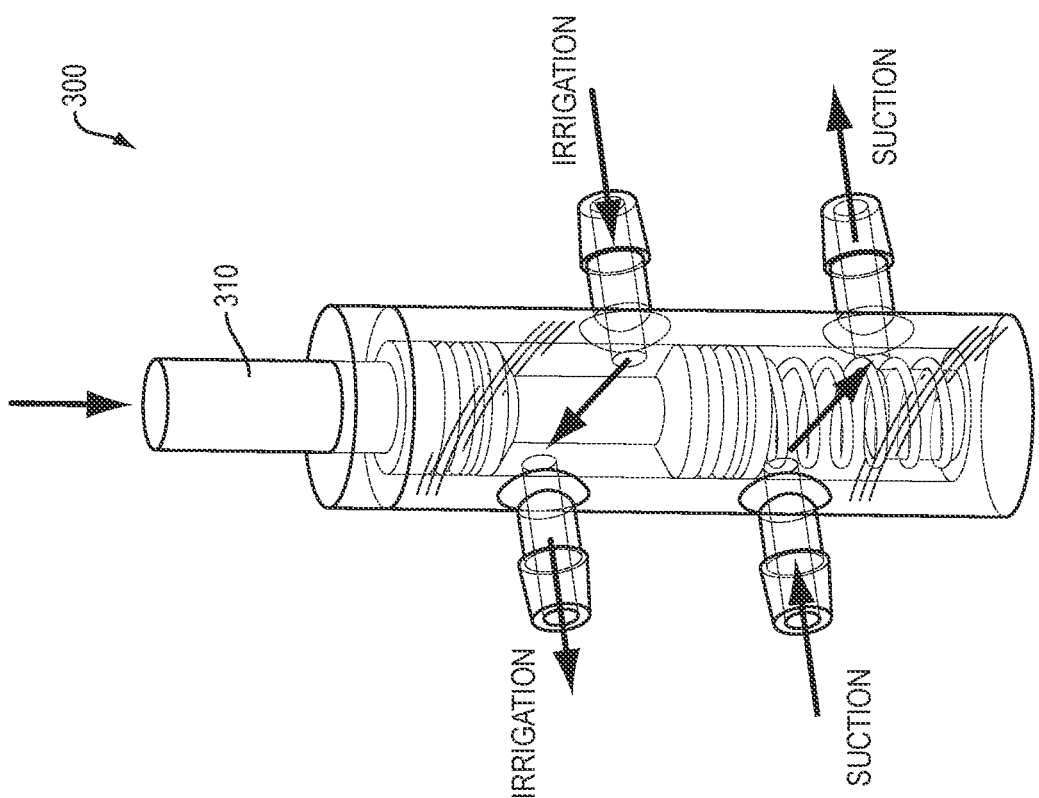

FIGS. 3A and 3B show an optional switch valve 300 or suction reversal valve that may help is dislodging a clog within the suction conduit. Switch valve is in fluid communication with both the fluid delivery and aspiration tubes, and may be disposed within the handle housing and along the tubing proximally spaced away from the handle 204. This valve 300 can be toggled to shut off suction and push the irrigation down the suction conduit. In operation, actuator 310 may be gradually translated for example to reduce the distance from the top of the device to the valve to gradually increase the speed of the flow reversal. In other embodiments the toggle valve 300 can be engaged with a solenoid, or could also lock in place (similar to a clicking ball-point pen).

Figure 4A:
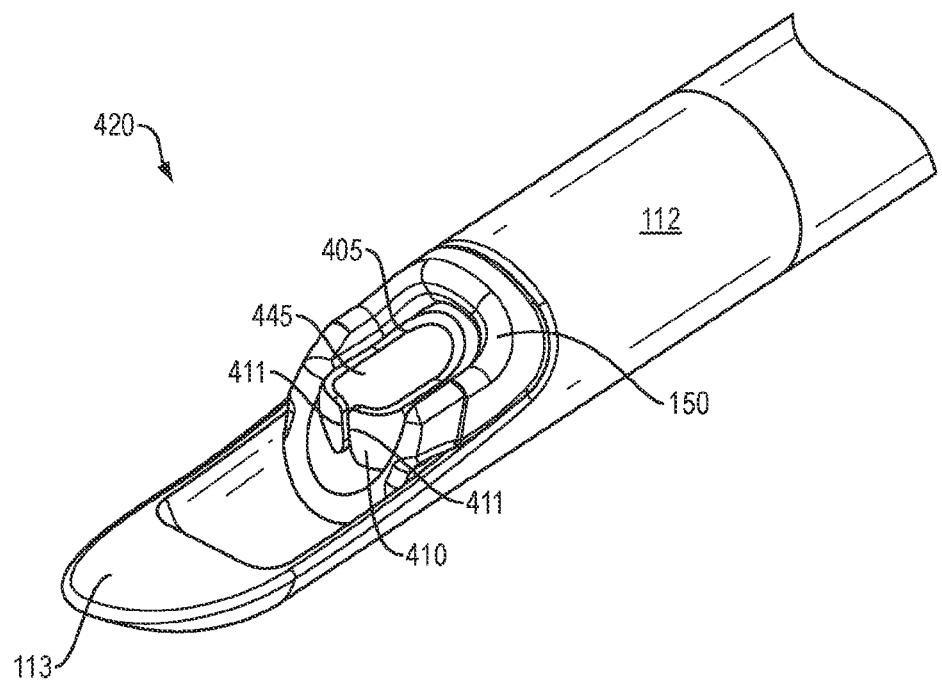
FIG. 4A schematically shows an isometric view of a wand distal end for treating tissue according to at least certain embodiments.
Figure 4B:
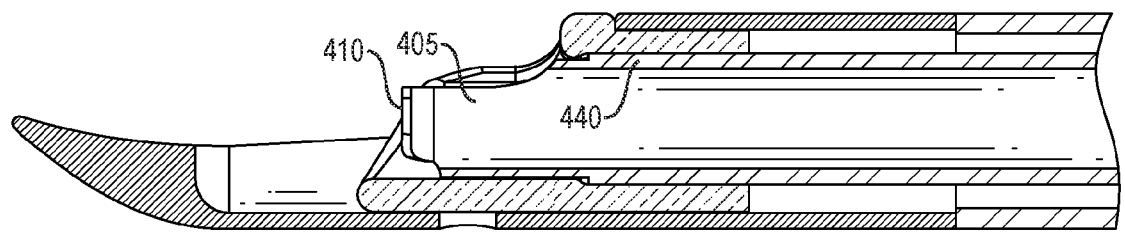
FIG. 4B schematically shows a cross section of the wand distal end shown in at least FIG. 4A.

Active electrode 104 may have a bulbous or rounded end 105 that is smooth, and therefore may not readily form a plasma therealong (or at least as readily as the edges at aperture 245). An alternative distal end embodiment 420 is shown FIGS. 4A-4C, having similar components as the embodiment disclosed in FIGS. 2A-2I, except that the active electrode 405 may have a more orthogonal distal facing surface 410. Surface 410 may be formed by splitting and bending two arms at the end of the suction tube 440 towards each other and across a substantial portion of the suction tube diameter. Suction tube 440 may be similar to tubular member 242. As such, distal facing surface 410 may include two edge surfaces 411 that may abut each other or be slightly spaced apart; such that the two edge surfaces 411 may provide surface asperities that may more naturally form a high current density therealong and therefore more readily form plasma therealong. This may therefore provide a broader and stronger rate of ablation that a rounded or bulbous end such as the embodiment shown in FIGS. 2A-2C for example. Distal facing surface is configured to provide a barrier and limit tissue from sliding into aperture 445 while gaining access to the turbinate tissue In addition distal end embodiment 420 may include aperture 445 with a similar location and function to aperture 245. Aperture 445 however extends further laterally to the edge of and distally up to the two arms at the end of the suction tube 440. Aperture 445 is therefore larger allowing for more debris removal and less likelihood of clogging.

Another wand embodiment for reducing a turbinate is disclosed in FIGS. 7A-7F. Like parts are labeled with like reference numerals. Elevator tip 113 defines a non-blunt distal edge 117 to pierce the turbinate tissue and may include a distal facing convex surface 119 shaped to direct or plough the loosened tissue away from the active electrode 704 and aperture 745. Distal facing convex surface 119 may define a convex direction or convex side of the shaft. Leading edge 117 may extend around and define first and second arcuate edges 121 defining lateral edges of the arcuate surface. Shaft may also define a conduit opening 770 proximally spaced from the distal-most edge and on an opposing side to the convex side.

Opening 770 may nest an insulative spacer 750 and electrode 704 therein. Electrode treatment surface 705 may be oriented at an angle θ to the longitudinal axis. Angle θ may open through the wand distal end and range between 100-150 degrees. In this embodiment, active electrode 704 may define a partial or complete loop or ring element defining a single aperture 745 therethrough. The loop active electrode 704 defines at least a portion of the aperture boundary, and as shown aperture, 745 may define a 360-bounded hole, bounded entirely by electrode 704. Furthermore illustrated in FIG. 2E, electrode 704 defines a maximum loop leg width W1 with a single aperture therethrough that has a maximum width W2, the width W2 being substantially larger than loop leg width W1. For example, W2 may be at least 50% greater than W1. In some example embodiments, W2 may be at least double W1. In some further example embodiments, W2 may be at least three times that of W1. Aperture width W2 may be between 0.030-0.040 inches while W1 may be between 0.005-0.010 inches. Having a large aperture reduces tissue clogging and allows access for a declogging tool should it be required.

Figure 7A:
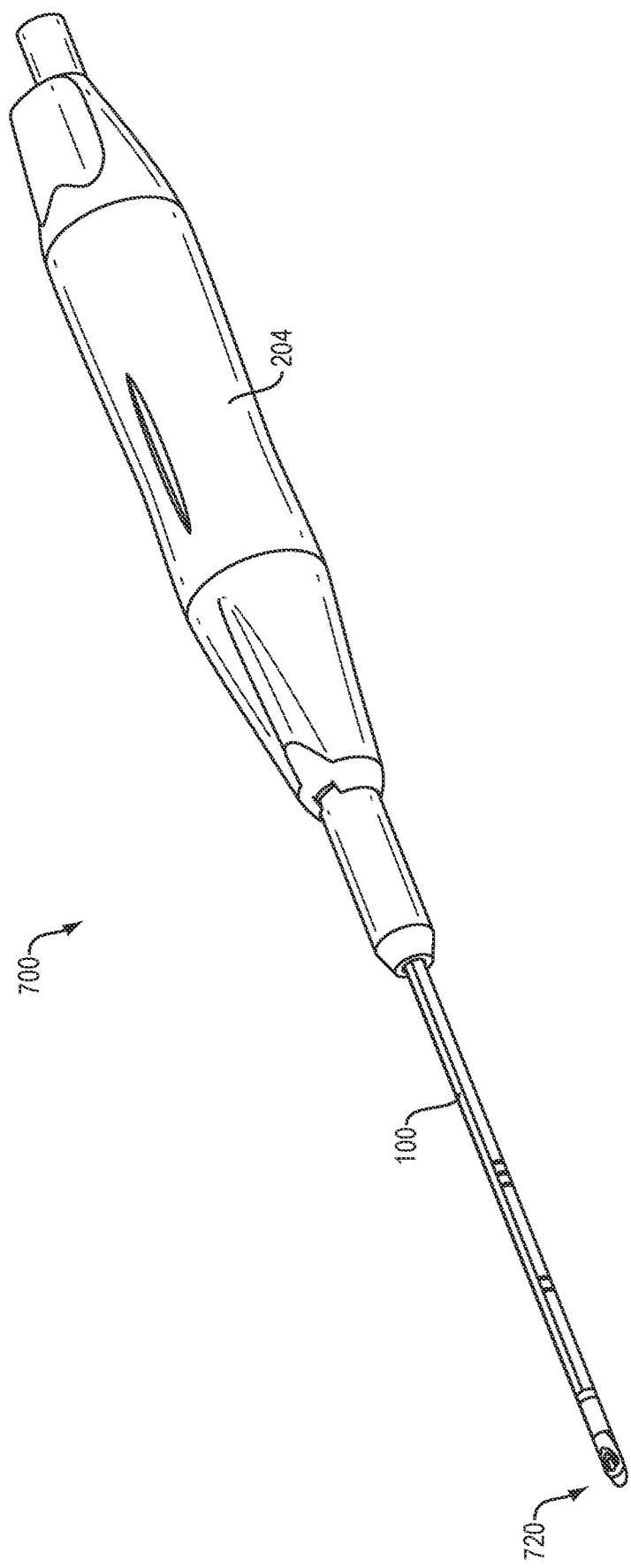
FIG. 7A illustrates an alternative embodiment of a wand for treating a turbinate according to at least certain embodiments.
Figure 7B:
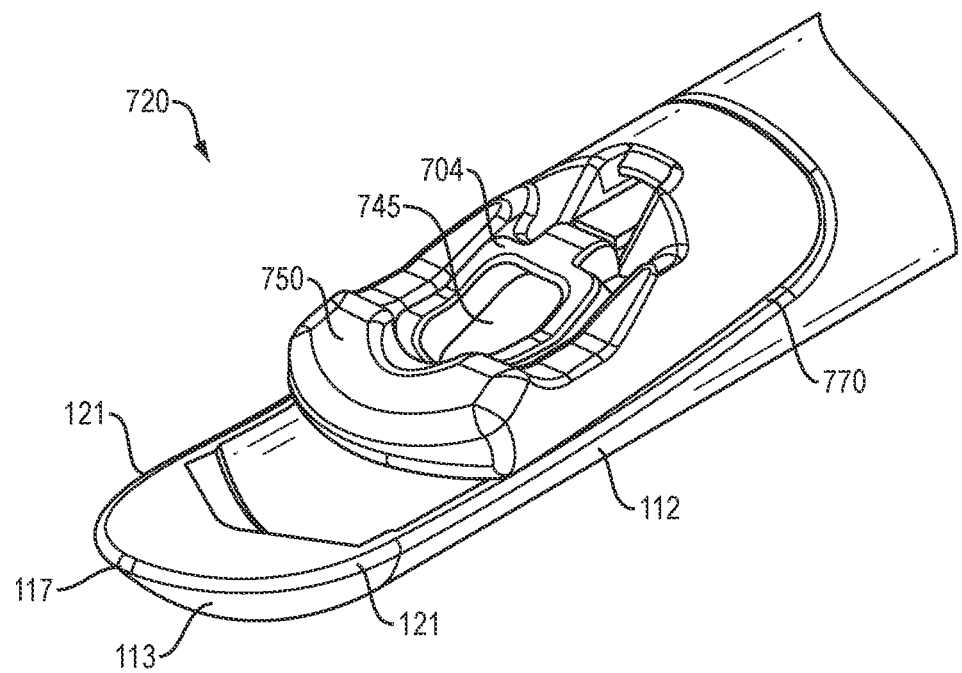
FIG. 7B illustrates an isometric view of a wand distal end for treating a turbinate according to at least certain embodiments.
Figure 7C:
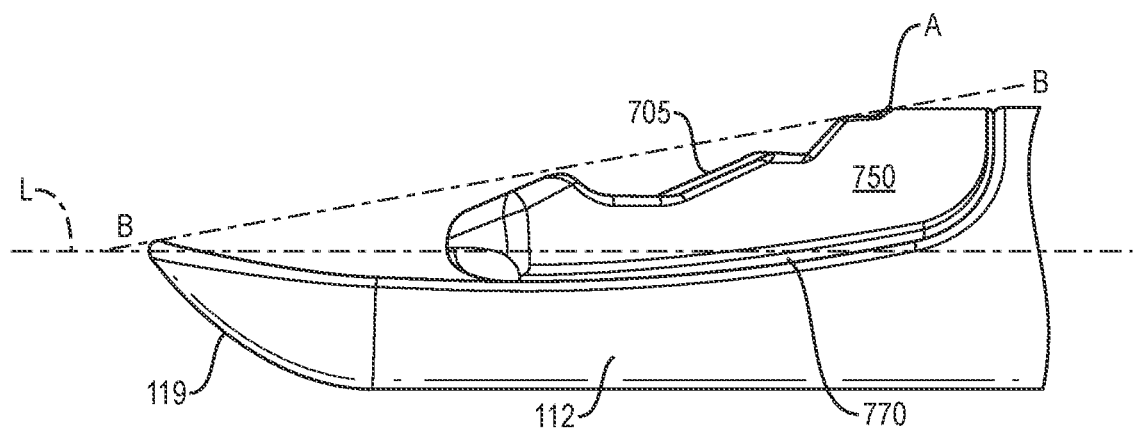
FIG. 7C illustrates a view of a side view of the wand distal end shown in at least FIG. 7B.

Best seen in FIG. 7C elevator tip 113 distal most edge 117 may be coincident with a longitudinal axis. In some other embodiments, distal-most edge 117 may extend further away from the convex side, to be coincident with a plane that is parallel to the longitudinal axis and offset towards away from the convex side of the shaft. Distal-most edge 117 and point A on the spacer 750 define two points along a reference line B-B, configured to define a position of the active electrode 704 relative to the turbinate bone. As explained earlier, it is preferable that the active electrode 705 is spaced medially from this entire line, this line indicative of a surface of the turbinate bone.

Figure 7D:
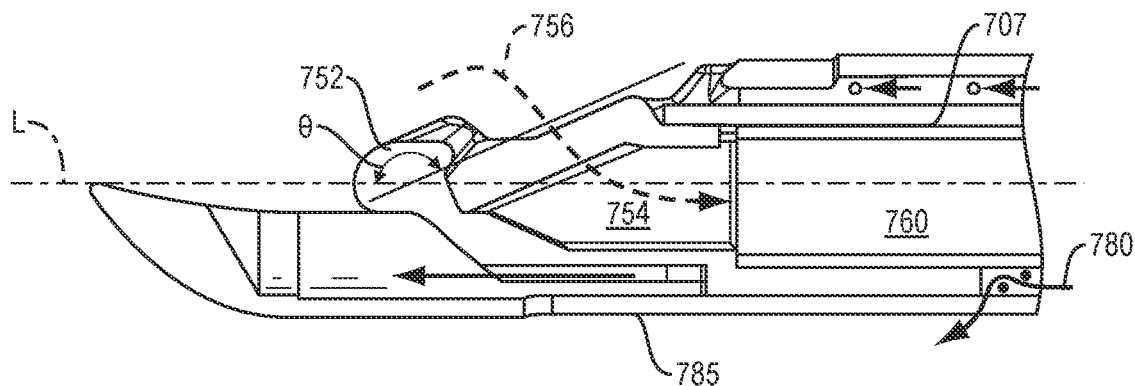
FIG. 7D illustrates a cross section of the wand distal end embodiment shown in at least FIG. 7B.
Figure 7E:
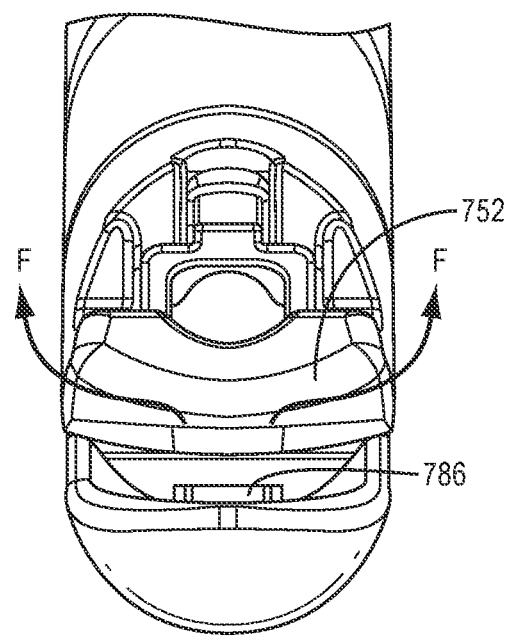
FIG. 7E illustrates an end view of the wand distal end shown in at least FIG. 7B.
Figure 7F:
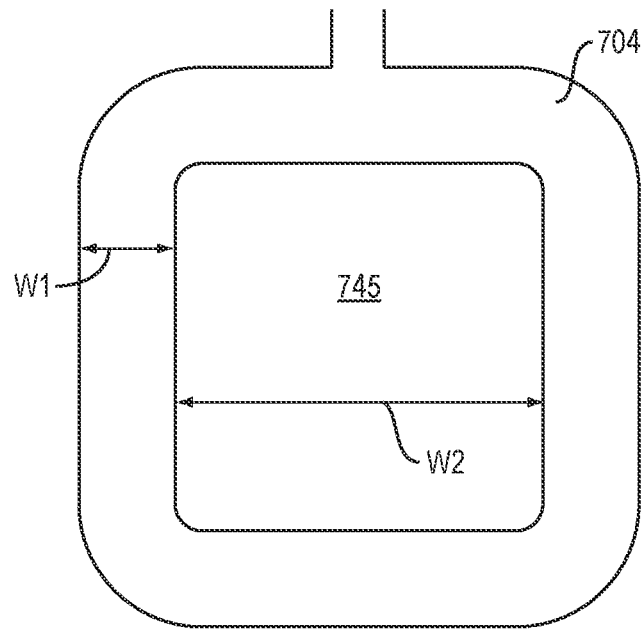
FIG. 7F illustrates an electrode of the wand distal end embodiment shown in at least FIG. 7B.
Figure 7G:
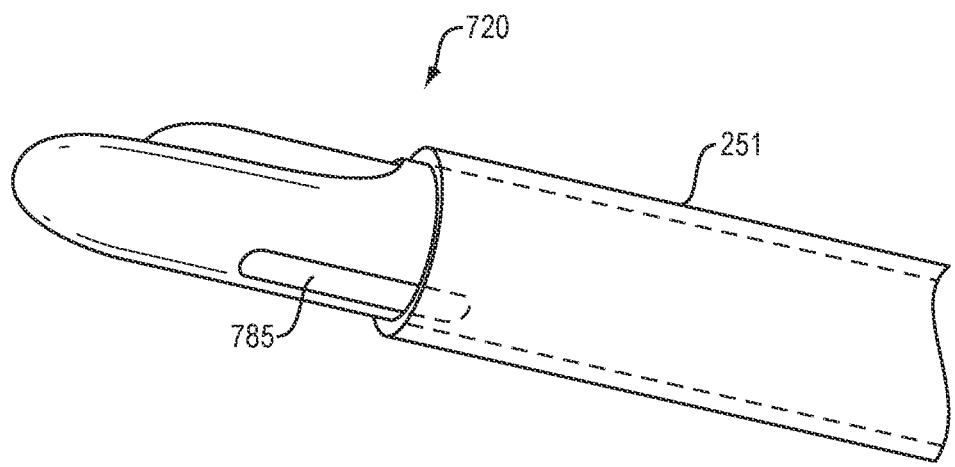
FIG. 7G illustrates a fluid delivery portion of the wand distal end embodiment shown in at least FIG. 7B.

Seen best in FIG. 7D, showing a cross section of the distal end 720, spacer 750 may include a distal ridge 752. Similar to the convex surface 119, ridge 752 may act like a plough and deflect loose pieces of tissue away from active electrode aperture 745. This may help avoid clogging of the aperture 745 and the associated aspiration construct. Ridge 752 defines a protruding portion of the spacer 750 distal to the active electrode 704, and partially overlaps the active electrode 704. External surface of the ridge 752 may extend further away from the longitudinal axis of the shaft than a distal portion of the aperture 745. Ridge 752 may be configured to deflect tissue around the lateral sides of the wand distal end 720, as indicated by arrows F in FIG. 7E.

Also shown in FIG. 7D shaft may house a fluid aspiration construct including a tube 760 or elongate conduit. Tube 760 may be in fluid communication with aperture 745 and a conduit 754 defined by spacer at a distal end, and in fluid communication with a negative pressure source (not shown) at the other end, via tubing 42 at a proximal end. Tube 760 may be formed from a polymer, and may have a larger inner diameter or cross section than conduit 754 and aperture 745. In accordance with at least some embodiments, the combination of the aperture 745 may create a constriction in proximity to the active electrode 704 (and thus the plasma). The constriction created by the interplay between the aperture 745 and the proximally disposed apertures (754, 760) illustrates an operational philosophy implemented in example systems. This philosophy relies on tissue being broken into pieces just small enough to pass through the constriction presented by the aperture 745. The aperture or cross section sizes of apertures 754 and 760, opens or widens behind the aperture 745, and thus if tissue can fit though the aperture 745, the tissue is likely then to traverse the entire aspiration construct or path without clogging.

The operational philosophy is aided by the cross-sectional area of the aperture 745 through the example active electrode 704. In particular, the cross-sectional area of the aperture 745 may be preferably smaller than both the spacer aperture 754 and tube inner diameter. Thus, a piece of tissue need only be small enough in any two dimensions to fit through the aperture 745 and thereafter will encounter only greater cross-sectional area as the tissue moves through the aspiration path. In accordance with example systems, the difference in cross-sectional area as between the aperture 745 and aperture 754, 760 may be between and including one percent (1%) and thirty percent (30%), and in a particular case at least twenty percent (20%). Tube 760 may extend along the shaft and through handle, as illustrated in earlier figures.

In this embodiment, active electrode 704 may be electrically coupled using electrical cabling 707 for example. Furthermore, electrically conductive fluid 780 may be delivered to the distal end 720 along the shaft. Shaft may define a portion of the fluid delivery construct, such that the conduit is an annular gap bounded by an inner surface of the outer shaft and an outer surface of the tube 760. Fluid 780 may be delivered to the external surfaces of the distal end 720 via aperture(s) 785 though an underside of shaft, axially adjacent the active electrode 704. Fluid may also be delivered through aperture 786, fluidly coupled to annular gap.

A further embodiment of an electrosurgical device distal end 820 is disclosed for treating a turbinate in FIGS. 8A-8D. Similar to previously disclosed embodiments, distal end 820 includes an elevator tip 813 with a convex surface 819, spacer 850 and electrode 804. Active electrode 804 may be electrically coupled to an electrosurgical generator via cabling 807. In this example embodiment, active electrode 804 and spacer 850 are oriented such that a fluid aspiration path 876 into the shaft follows a less tortuous route than flow path 756 associated with the embodiments in FIGS. 7A-7F. A fluid aspiration path that is more of a straight shot with less alteration in direction allows for consistent fluid aspiration volume that may reduce clogging. More specifically this embodiment defines a fluid suction path that is closer to parallel relative to the longitudinal axis L than the path for embodiment shown in FIG. 7D. In short, this suction path requires less alteration in direction. This allows the flow to move debris more effectively along the fluid flow path. This may however tend to allow more loose tissue particles into the aperture 845, and therefore a more extended elevator tip 813 configuration may be preferable to redirect some of the debris/loose tissue. Elevator tip configuration may extend further around the device distal end 820, such that distal most edge 817 is coincident with a plane that is parallel and offset from the longitudinal axis.

This embodiment may also include an active electrode 804 with a protrusion 805 that extends into aperture 845 on proximal end of aperture 845. Protrusion 805 is configured to interrupt the aperture 845 and locally reduce the effective aperture size. This reduced aperture size may reduce clogging. As explained earlier, it has been found that a progressively increasing conduit size of diameter from the entry aperture 845 to the tubing 760 may help reduce clogging. Therefore, the protrusion locally reduces the opening size of the entry aperture 845, such that the opening size of the conduit 854 through spacer 850 is slightly larger than entry aperture 845, and the lumen diameter of tube 760 is larger than conduit 854. External surface of protrusion 805 may also serve as a sliding surface for a declogging tool that may be inserted into and along the aspiration construct to may protect upper portions of the aspiration construct.

Although only a few embodiments of the present invention have been described, it should be understood that the present invention may be embodied in many other specific forms without departing from the spirit or the scope of the present invention. Therefore, the present examples are to be considered as illustrative and not restrictive, and the invention is not to be limited to the details given herein, but may be modified within the scope of the appended claims.

The invention claimed is:

1. An electrosurgical device for reducing a turbinate comprising:
    a handle;
    an elongate shaft having a major longitudinal axis extending along a center of the elongate shaft, a conduit extending therethrough and a non-insulated distal end portion defining a first electrode, the first electrode having:
        a distal most edge configured to mechanically pierce tissue;
        an arcuate surface extending proximally from the distal most edge, along and away from the major longitudinal axis, the arcuate surface having a convex surface that faces in a distal direction;
        first and second arcuate edges defining lateral edges of the arcuate surface, the lateral edges defining exposed electrosurgical surfaces; and a second electrode, disposed at an opening of the conduit and electrically isolated from the first electrode, the second electrode comprising an aperture therethrough, configured to aspirate fluid and tissue debris therethrough.

2. The electrosurgical device of claim 1 further comprising an inner tube configured to fluidly couple a negative pressure source to the second electrode aperture and coaxially disposed within the shaft.

3. The electrosurgical device of claim 1 wherein the arcuate surface is configured to direct tissue that has been pierced and thereby loosened by the distal most edge away from the second electrode aperture and thereby reduce clogging of the aperture.

4. The electrosurgical device of claim 1 further defining an outer bearing surface proximally spaced from the second electrode, and wherein the second electrode is medially spaced away from a plane that extends axially and through both the outer bearing surface and the distal most edge.

5. The electrosurgical device of claim 4 wherein the distal most edge and outer bearing surface are configured to laterally space the second electrode away from a turbinate bone surface with the distal most edge and outer bearing surface simultaneously engaging the turbinate bone surface.

6. The electrosurgical device of claim 1 wherein the non-insulated distal end portion is configured to minimize an incision distention while translating the device along the turbinate.

7. The electrosurgical device of claim 1 wherein the arcuate surface extends across the major longitudinal axis such that the distal most edge is offset from the major longitudinal axis and on a same side of the major longitudinal axis as the second electrode.

8. The electrosurgical device of claim 1 wherein the second electrode defines a loop the aperture at least partially bounded by the loop and wherein a transverse dimension of a single leg of the loop is substantially smaller than a corresponding transverse dimension of the aperture.

9. The electrosurgical device of claim 1 wherein the second electrode and the distal most edge are radially coextensive.

10. The electrosurgical device of claim 1 further comprising a fluid delivery construct, fluidly coupled to a fluid source and having a fluid delivery aperture at the device distal end portion through a portion of the shaft on an opposing side of the distal end portion as the second electrode.

11. A method of reducing a turbinate, the method comprising:
piercing the turbinate with a sharp leading edge of an electrosurgical instrument, the sharp leading edge defining a distal-most end of a tapered elevator tip, a distal facing convex surface extending proximally from a first side of the sharp leading edge and away from a central longitudinal axis of the electrosurgical instrument;
simultaneously engaging a turbinate bone surface with both the sharp leading edge and a second external surface of the electrosurgical instrument, the second external surface proximally spaced from and directly adjacent an active electrode of the electrosurgical instrument, so as to place the entire active electrode towards the center of the turbinate and spaced away from the turbinate bone surface;
selecting a tissue treatment mode on an electrosurgical generator electrically coupled to the instrument and supplying energy to the active electrode so as to reduce the turbinate, and while supplying:
moving the active electrode through the turbinate while maintaining engagement between the turbinate bone surface and at least the sharp leading edge and thereby reducing the turbinate.

12. The method of claim 11 wherein selecting a tissue treatment mode comprises selecting from a group consisting of a high debulking mode, a medium debulking mode, a pulsing thermal shrinking mode and a coagulation mode.

13. The method of claim 12 wherein the pulsing thermal shrinking mode includes pulsing a voltage delivered to the tissue between a low voltage to thermally shrink the turbinate and a short higher voltage pulse to remove tissue adjacent the active electrode.

14. The method of claim 11 wherein selecting a mode also selects a fluid delivery rate of electrically conductive fluid to the turbinate tissue.

15. The method of claim 11 further comprising aspirating fluid and tissue debris through an aperture through the active electrode.

16. The method of claim 11 wherein while piercing the turbinate and moving the active electrode, directing loosened turbinate tissue away from the active electrode with the distal facing convex surface.

17. An electrosurgical device for treating a turbinate comprising:
a handle;
a shaft having a major longitudinal axis extending along a shaft center, and a conduit extending therethrough;
a non-insulated distal end portion defining a first electrode, the first electrode having: a distal most edge having an exposed electrosurgical surface, the distal most edge configured to mechanically pierce tissue;
an arcuate convex surface extending proximally from the distal most edge along and away from the major longitudinal axis, the arcuate surface defining a convex direction;
first and second arcuate edges defining lateral edges of the arcuate surface, the lateral edges defining exposed electrosurgical surfaces; and
a conduit opening proximally spaced from the distal-most edge and on an opposing side to the convex direction; and
a second electrode nested within the conduit opening, and electrically isolated from the first electrode, the second electrode defining a loop defining a distally facing single aperture therethrough, the single aperture in fluid communication with a fluid aspiration construct that extends along the major longitudinal axis.

18. The electrosurgical device of claim 17 wherein the single aperture defines a width that is at least double the width than a corresponding width of a leg of the active electrode loop.

19. The electrosurgical device of claim 17 wherein the distal most edge coincides with a plane that lies on the major longitudinal axis.

20. The electrosurgical device of claim 17 wherein the second electrode includes a projection that extends into the single aperture, configured to reduce clogging.

\* \* \* \* \*